(12) United States Patent
Wang

(10) Patent No.: US 12,420,186 B2
(45) Date of Patent: Sep. 23, 2025

(54) METHOD AND APPARATUS FOR DISPLAYING PICTURE IN VIRTUAL SCENE, DEVICE, STORAGE MEDIUM, AND PROGRAM PRODUCT

(71) Applicant: Tencent Technology (Shenzhen) Company Limited, Guangdong (CN)

(72) Inventor: Tao Wang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 387 days.

(21) Appl. No.: 17/992,599

(22) Filed: Nov. 22, 2022

(65) Prior Publication Data

US 2023/0086441 A1 Mar. 23, 2023

Related U.S. Application Data

(63) Continuation of application No. PCT/CN2021/141708, filed on Dec. 27, 2021.

(30) Foreign Application Priority Data

Jan. 22, 2021 (CN) .......................... 202110090636.X

(51) Int. Cl.
*A63F 13/5252* (2014.01)
*A63F 13/803* (2014.01)
(Continued)

(52) U.S. Cl.
CPC ........ *A63F 13/5252* (2014.09); *A63F 13/803* (2014.09); *A63F 13/214* (2014.09);
(Continued)

(58) Field of Classification Search
CPC .. A63F 13/5252; A63F 13/803; A63F 13/214; A63F 13/5255; A63F 13/837; A63F 2300/6669; A63F 2300/8017
(Continued)

(56) References Cited

U.S. PATENT DOCUMENTS 5,299,810 A * 4/1994 Pierce ................... A63F 13/285
463/2
6,632,138 B1 * 10/2003 Serizawa .............. A63F 13/803
463/31
(Continued)

FOREIGN PATENT DOCUMENTS

CN 108421254 A 8/2018
CN 108421256 A 8/2018
(Continued)

OTHER PUBLICATIONS

Bilibili video entitled: "The top professional champion of running karting end game, was beaten and dismissed by the master of mobile games!" Uploaded Jul. 19, 2019, by User "Go Kart Coke," Retrieved from the Internet: <URL: https://www.bilibili.com/video/BV1Dt411J7ME/?spm_id_from=333.337.search-card.all.click&vdsource=76d3264acb028cc08fccd0a145e89a77,> 2 pages.
(Continued)

*Primary Examiner* — Allen Chan
(74) *Attorney, Agent, or Firm* — ArentFox Schiff LLP

(57) ABSTRACT

A method for displaying a picture in a virtual scene is provided. In the method, the virtual scene of a virtual environment is displayed. The virtual scene includes a first virtual vehicle. A target virtual vehicle of at least one second virtual vehicle is determined based on a distance between the first virtual vehicle and each of the at least one second virtual vehicle. Each of the at least one second virtual vehicle is located behind the first virtual vehicle in the virtual environment. An auxiliary picture is displayed in the virtual scene. The auxiliary picture of the target virtual vehicle is from a point of view associated with the first virtual vehicle.

19 Claims, 9 Drawing Sheets

(51) Int. Cl.
  *A63F 13/214* (2014.01)
  *A63F 13/5255* (2014.01)
  *A63F 13/837* (2014.01)
(52) U.S. Cl.
  CPC ......... *A63F 13/5255* (2014.09); *A63F 13/837* (2014.09); *A63F 2300/6669* (2013.01); *A63F 2300/8017* (2013.01)
(58) Field of Classification Search
  USPC .......................................................... 463/6
  See application file for complete search history.

(56) References Cited

U.S. PATENT DOCUMENTS

| | | | | |
|---|---|---|---|---|
| 7,537,522 | B2 * | 5/2009 | Plavetich | A63F 13/00 463/36 |
| 8,342,926 | B2 * | 1/2013 | Garvin | A63F 13/56 463/7 |
| 10,357,715 | B2 * | 7/2019 | Buxton | G09B 9/04 |
| 10,453,262 | B1 | 10/2019 | Falstrup et al. | |
| 10,475,350 | B1 * | 11/2019 | Nepomuceno | G06Q 40/08 |
| 2006/0040239 | A1 * | 2/2006 | Cummins | G09B 9/05 434/62 |
| 2020/0353356 | A1 | 11/2020 | Li et al. | |

FOREIGN PATENT DOCUMENTS

| | | |
|---|---|---|
| CN | 108479068 A | 9/2018 |
| CN | 109866763 A | 6/2019 |
| CN | 109887372 A | 6/2019 |
| CN | 112172670 A | 1/2021 |
| CN | 112870712 A | 6/2021 |
| TW | 200924825 A | 6/2009 |

OTHER PUBLICATIONS

International Search Report and Written Opinion in PCT/CN2021/141708, mailed Apr. 7, 2022, 10 pages.
Office Action in CN202110090636.X, mailed Oct. 25, 2022, 10 pages.
Office Action in TW11120778170, mailed Aug. 5, 2022, 16 pages.
Yingbai, Kan Bai Situ, "Go Kart What Button to press to look at the rearview mirror," Baidu, Oct. 13, 2019, Retrieved from the Internet: <URL: https://zhidao.baidu.com/question/631950901641631364.html>, 2 pages.

* cited by examiner

METHOD AND APPARATUS FOR DISPLAYING PICTURE IN VIRTUAL SCENE, DEVICE, STORAGE MEDIUM, AND PROGRAM PRODUCT

RELATED APPLICATIONS

The present application is a continuation of International Application No. PCT/CN2021/141708 filed on Dec. 27, 2021, which claims priority to Chinese Patent Application No. 202110090636.X filed on Jan. 22, 2021. The entire disclosures of the prior applications are hereby incorporated by reference in their entirety.

FIELD OF THE TECHNOLOGY

This application relates to the field of virtual scene technologies, including a method and an apparatus for displaying a picture in a virtual scene, a computer device, a storage medium, and a computer program product.

BACKGROUND OF THE DISCLOSURE

In a game application for manipulating a virtual vehicle, for example, in a racing game, a user may simulate a rear-view mirror function of an actual driving vehicle in a game interface.

In the related art, a rear-view mirror function control may be superimposed on a virtual scene picture. By receiving a trigger operation from the user on the rear-view mirror function control, the virtual scene picture displayed on the display screen of the terminal can be directly switched to a rear perspective of a virtual vehicle.

However, in the related art, when triggering the rear-view mirror function control to directly display the virtual scene picture from the rear perspective in full screen, there may be a situation where the user cannot observe the picture in front of the virtual vehicle, which affects the interaction efficiency when the user controls the virtual vehicle and reduces the efficiency of human-computer interaction.

SUMMARY

Embodiments of this disclosure provide a method and an apparatus for displaying a picture in a virtual scene, a computer device, a non-transitory computer-readable storage medium, and a computer program product, which can improve the efficiency of human-computer interaction.

An embodiment of this disclosure provides a method for displaying a picture in a virtual scene. The virtual scene of a virtual environment is displayed. The virtual scene includes a first virtual vehicle. A target virtual vehicle of at least one second virtual vehicle is determined based on a distance between the first virtual vehicle and each of the at least one second virtual vehicle. Each of the at least one second virtual vehicle is located behind the first virtual vehicle in the virtual environment. An auxiliary picture is displayed in the virtual scene. The auxiliary picture of the target virtual vehicle is from a point of view associated with the first virtual vehicle.

An embodiment of this disclosure further provides a method for displaying a picture in a virtual scene. A virtual scene picture is displayed. The virtual scene picture includes a first virtual vehicle. A first auxiliary picture is displayed in the virtual scene picture. The first auxiliary picture is a picture with a first target virtual vehicle as a focus and captured by a virtual camera arranged corresponding to the first virtual vehicle. The first target virtual vehicle is a virtual vehicle with a smallest relative distance from the first virtual vehicle and the relative distance being less than or equal to a first distance. A second auxiliary picture is displayed in the virtual scene picture in response to the virtual vehicle with the smallest relative distance from the first virtual vehicle and the relative distance being less than or equal to the first distance being switched to a second target virtual vehicle. The second auxiliary picture is a picture with the second target virtual vehicle as a focus and captured by the virtual camera arranged corresponding to the first virtual vehicle.

An embodiment of this disclosure further provides an apparatus for displaying a picture in a virtual scene. The apparatus includes processing circuitry configured to display the virtual scene of a virtual environment, the virtual scene including a first virtual vehicle. The processing circuitry is configured to determine a target virtual vehicle of at least one second virtual vehicle based on a distance between the first virtual vehicle and each of the at least one second virtual vehicle. Each of the at least one second virtual vehicle is located behind the first virtual vehicle in the virtual environment. The processing circuitry is configured to display an auxiliary picture in the virtual scene. The auxiliary picture is of the target virtual vehicle from a point of view associated with the first virtual vehicle.

An embodiment of this disclosure further provides an apparatus for displaying a picture in a virtual scene. The apparatus includes processing circuitry configured to display a virtual scene picture. The virtual scene picture includes a first virtual vehicle. The processing circuitry is configured to display a first auxiliary picture in the virtual scene picture. The first auxiliary picture is a picture with a first target virtual vehicle as a focus and captured by a virtual camera arranged corresponding to the first virtual vehicle. The first target virtual vehicle is a virtual vehicle with a smallest relative distance from the first virtual vehicle and the relative distance being less than or equal to a first distance. The processing circuitry is configured to display a second auxiliary picture in the virtual scene picture in response to the virtual vehicle with the smallest relative distance from the first virtual vehicle and the relative distance being less than or equal to the first distance being switched to a second target virtual vehicle. The second auxiliary picture is a picture with the second target virtual vehicle as a focus and captured by the virtual camera arranged corresponding to the first virtual vehicle.

An embodiment of this disclosure further provides a computer device, including a processor and a memory, the memory storing at least one instruction, at least one program, a code set or an instruction set, the at least one instruction, the at least one program, the code set or the instruction set being loaded and executed by the processor to implement any of the foregoing methods for displaying a picture in a virtual scene.

An embodiment of this disclosure provides a non-transitory computer-readable storage medium, storing instructions which when executed by a processor cause the processor to perform any of the foregoing methods for displaying a picture in a virtual scene.

An embodiment of this disclosure further provides a computer program product or a computer program. The computer program product or the computer program includes computer instructions, and the computer instructions are stored in a computer-readable storage medium. A processor of a terminal reads the computer instructions from the computer-readable storage medium, and executes the computer instructions, to cause the terminal to perform the method for displaying a picture in a virtual scene in various implementations of the foregoing aspect.

Technical solutions provided in the embodiments of this disclosure may have at least the following beneficial effects:

The relative distance between the first virtual vehicle and the second virtual vehicle is detected in real time, the target virtual vehicle is determined, the virtual scene is captured by the virtual camera with the target virtual vehicle as the focus, and the captured auxiliary picture is displayed. Since the relative distance between the second virtual vehicle and the first virtual vehicle may change frequently, the target virtual vehicle corresponding to each moment can be flexibly determined through the foregoing solution, and the auxiliary picture with the target virtual vehicle as the focus is displayed. Therefore, the auxiliary picture can display effective pictures as much as possible, which improves the efficiency of the auxiliary picture in transmitting information beneficial to user operations, and may better ensure that the user can observe the effective picture content behind the vehicle while observing the picture in front of the virtual vehicle normally, thereby improving the interaction efficiency during control of the virtual vehicles, and improving the efficiency of human-computer interaction.

DESCRIPTION OF EMBODIMENTS

Figure 1:
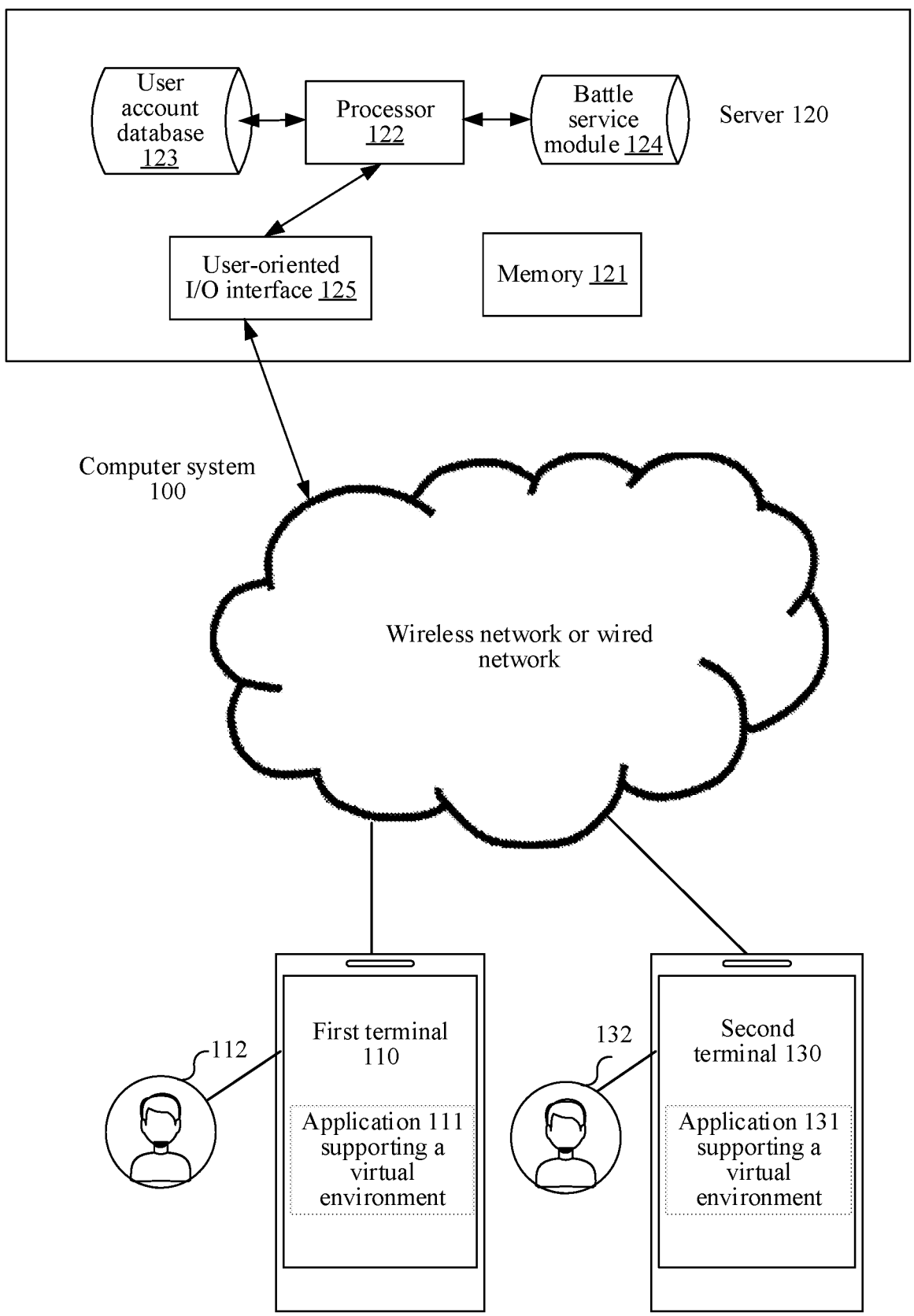
FIG. 1 is a schematic diagram of an implementation environment according to an embodiment of this disclosure.

Technical solutions in embodiments of this disclosure are described below with reference to the accompanying drawings in the embodiments of this disclosure. The described embodiments are merely some rather than all of the embodiments of this disclosure. Other embodiments are within the scope of this disclosure.

In the following description, the term "some embodiments" describes subsets of all possible embodiments, but it may be understood that "some embodiments" may be the same subset or different subsets of all the possible embodiments, and can be combined with each other without conflict.

In the following descriptions, the included term "first/second" is merely intended to distinguish similar objects but does not necessarily indicate a specific order of an object. It may be understood that "first/second" is interchangeable in terms of a specific order or sequence if permitted, so that the embodiments of this disclosure described herein can be implemented in a sequence in addition to the sequence shown or described herein.

"Several" mentioned in this specification means one or more, and "plurality of" means two or more. And/or describes an association relationship for describing associated objects and represents that three relationships may exist. For example, A and/or B may represent the following three cases: Only A exists, both A and B exist, and only B exists. The character "/" generally indicates an "or" relationship between the associated objects.

For convenience of understanding, terms in this disclosure are described.

1) Virtual Scene

A virtual scene may be displayed (or provided) when an application program is run on a terminal. The virtual scene may be a simulated environment scene of a real world, or may be a semi-simulated semi-fictional three-dimensional environment scene, or may be an entirely fictional three-dimensional environment scene. The virtual scene may be any one of a two-dimensional virtual scene, a 2.5-dimensional virtual scene, and a three-dimensional virtual scene, and description is made by using an example in which the virtual scene is a three-dimensional virtual scene in the following embodiments, but this is not limited. In some embodiments, the virtual scene may be further used for a virtual scene battle between at least two virtual roles. The virtual scene may be further used for a battle between at least two virtual roles by using virtual guns. In some embodiments, the virtual scene may be further used for a battle between at least two virtual roles by using virtual guns in a range of a target region, and the range of the target region may be continuously decreased as time goes by in the virtual scene.

The virtual scene is generally generated by an application program in a terminal such as a computer device and presented based on hardware (e.g., a screen) in the terminal. The terminal may be a mobile terminal such as a smartphone, a tablet computer, or an ebook reader. Alternatively, the terminal may be a personal computer device such as a notebook computer or a fixed computer.

2) Virtual Object

A virtual object includes a movable object in a virtual scene. The movable object may be at least one of a virtual character, a virtual animal, and a virtual vehicle. In some embodiments, when the virtual scene is a three-dimensional virtual scene, the virtual object is a three-dimensional model created based on a skeletal animation technology. Each virtual object has a shape, a volume and an orientation in the three-dimensional virtual scene, and occupies some space in the three-dimensional virtual scene.

3) Virtual Vehicle

A virtual vehicle includes a virtual vehicle by which a virtual object can implement a driving operation according to control of an operation control by a user in a virtual environment. The functions that the virtual vehicle can achieve include acceleration, deceleration, braking, backing, steering, drifting, use of items, and the like. The functions can be realized automatically, for example, the virtual vehicle can automatically accelerate, or the virtual vehicle can automatically steer. The functions may be alternatively triggered according to the control of an operation control by the user. For example, when the user triggers a brake control, the virtual vehicle performs a braking action.

4) Automobile Racing Game

An automobile racing game includes a racing game implemented by a plurality of virtual vehicles for the purpose of achieving a specified competition goal and played in a virtual competition scene. In this virtual competition scene, a user may control a virtual vehicle corresponding to a terminal to compete with virtual vehicles controlled by other users. The user may alternatively control the virtual vehicle corresponding to the terminal to compete with an AI-controlled virtual vehicle generated by a client program corresponding to the racing game.

FIG. 1 is a schematic diagram of an implementation environment according to an embodiment of this disclosure. The implementation environment may include: a first terminal 110, a server 120, and a second terminal 130.

An application 111 supporting a virtual environment is installed and run on the first terminal 110, and the application 111 may be a multiplayer online battle program, or the application 111 may be an offline application. When the first terminal runs the application 111, a user interface of the application 111 is displayed on a screen of the first terminal 110. The application 111 may be a racing game (RCG), a sandbox game including a racing function, or other types of games including the racing function. In this embodiment, an example in which the application 111 is an RCG is used for description. The first terminal 110 is a terminal used by a first user 112. The first user 112 uses the first terminal 110 to control a first virtual vehicle located in the virtual environment to perform activities, and the first virtual vehicle may be referred to as a master virtual object of the first user 112. The activities of the first virtual vehicle include, but are not limited to, at least one of acceleration, deceleration, braking, backing, steering, drifting, or using items. For example, the first virtual vehicle may be a virtual vehicle, or a virtual model with virtual vehicle functions that is modeled according to other transport vehicles (e.g., ships or aircraft). The first virtual vehicle may be alternatively a virtual vehicle modeled according to a real vehicle model.

An application 131 supporting a virtual environment is installed and run on the second terminal 130, and the application 131 may be a multiplayer online battle program. When the second terminal 130 runs the application 131, a user interface of the application 131 is displayed on a screen of the second terminal 130. The client may be any one of an RCG game program, a Sandbox game, or other game programs that include the racing function. In this embodiment, an example in which the application 131 is an RCG game is used for description.

In some embodiments, the second terminal 130 is a terminal used by a second user 132. The second user 132 uses the second terminal 130 to control the second virtual vehicle located in the virtual environment to perform a driving operation, and the second virtual vehicle may be referred to as a master virtual vehicle of the second user 132.

In some embodiments, a third virtual vehicle may alternatively exist in the virtual environment, the third virtual vehicle is controlled by the AI corresponding to the application 131, and the third virtual vehicle may be referred to as an AI-controlled virtual vehicle.

In some embodiments, the first virtual vehicle, the second virtual vehicle, and the third virtual vehicle are in the same virtual world, and the first virtual vehicle and the second virtual vehicle may belong to the same camp, the same team, or the same organization, have a friend relationship, or have a temporary communication permission. In some embodiments, the first virtual vehicle and the second virtual vehicle may belong to different camps, different teams, or different organizations, or have a hostile relationship with each other.

In some embodiments, the applications installed on the first terminal 110 and the second terminal 130 are the same, or the applications installed on the two terminals are the same type of applications on different operating system platforms (e.g., Android system or iOS system). The first terminal 110 may generally refer to one of a plurality of terminals, and the second terminal 130 may generally refer to another one of a plurality of terminals. In this embodiment, only the first terminal 110 and the second terminal 130 are used as an example for description. The first terminal 110 and the second terminal 130 are of the same or different device types, the device type including at least one of a smartphone, a tablet computer, an e-book reader, an MP3 player, an MP4 player, a laptop, and a desktop computer.

FIG. 1 shows only two terminals. However, a plurality of other terminals may access the server 120 in different embodiments. In some embodiments, there are one or more terminals that are terminals corresponding to the developer. A developing and editing platform for the application supporting the virtual environment is installed on the terminal. The developer can edit and update the application on the terminal and transmit an updated application installation package to the server 120 through a wired or wireless network. The first terminal 110 and the second terminal 130 can download the application installation package corresponding to the application from the server 120 to update the application.

The first terminal 110, the second terminal 130, and the another terminal are connected to the server 120 through a wireless network or a wired network.

The server 120 includes at least one of one server, a server cluster formed by a plurality of servers, a cloud computing platform, or a virtualization center. The server 120 is configured to provide background services for an application program supporting a three-dimensional virtual environment. In some embodiments, the server 120 is responsible for primary computing work, and the terminal is responsible for secondary computing work; or the server 120 is responsible for secondary computing work, and the terminal is responsible for primary computing work; or the server 120 and the terminal perform collaborative computing by using a distributed computing architecture between each other.

In a schematic example, the server 120 includes a memory 121, processing circuitry such as a processor 122, a user account database 123, a battle service module 124, and a user-oriented input/output (I/O) interface 125. The processor 122 is configured to load instructions stored in the server 120, and process data in the user account database 123 and the battle service module 124. The user account database 123 is configured to store data of user accounts used by the first terminal 110, the second terminal 130, and the another terminal, for example, avatars of the user accounts, nicknames of the user accounts, battle effectiveness indexes of the user accounts, and service zones of the user accounts. The battle service module 124 is configured to provide a plurality of battle rooms for the users to battle, for example, a 1V1 battle room, a 3V3 battle room, a 5V5 battle room, and the like. The user-oriented I/O interface 125 is configured to establish communication between the first terminal 110 and/or the second terminal 130 by using a wireless network or a wired network for data exchange.

Figure 2:
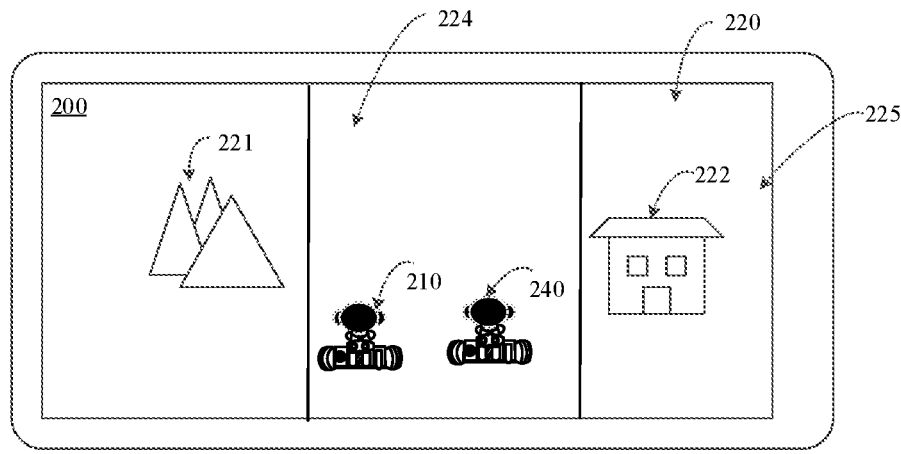
FIG. 2 is a schematic diagram of a display interface of a virtual scene according to an embodiment of this disclosure.

The virtual scene may be a three-dimensional virtual scene, or the virtual scene may be a two-dimensional virtual scene. Using an example in which the virtual scene is a three-dimensional virtual scene, FIG. 2 shows a schematic diagram of a display interface of a virtual scene according to an exemplary embodiment of this disclosure. As shown in FIG. 2, the display interface of the virtual scene includes a scene picture 200, and the scene picture 200 includes a currently controlled virtual vehicle 210, an environment picture 220 of the three-dimensional virtual scene, and a virtual vehicle 240. The virtual vehicle 240 may be a virtual object controlled by a user corresponding to another terminal, or a virtual object controlled by an application.

In FIG. 2, the currently controlled virtual vehicle 210 and the virtual vehicle 240 are three-dimensional models in the three-dimensional virtual scene, and the environment picture of the three-dimensional virtual scene displayed in the scene picture 200 includes objects observed from a third-person perspective of the currently controlled virtual vehicle 210. The third-person perspective corresponding to the virtual vehicle 210 refers to a perspective picture observed from the virtual camera arranged at the rear and upper part of the virtual vehicle. For example, as shown in FIG. 2, under the observation from the third-person perspective of the currently controlled virtual vehicle 210, the displayed environment picture 220 of the three-dimensional virtual scene includes a road 224, a sky 225, a hill 221, and a factory 222.

The currently controlled virtual vehicle 210 may perform operations such as steering, acceleration, and drifting under the control of the user. Under the control of the user, the virtual vehicle in the virtual scene may display different three-dimensional models. For example, the screen of the terminal supports touch operations, and the scene picture 200 of the virtual scene includes a virtual control. When the user touches the virtual control, the currently controlled virtual vehicle 210 may perform a specified operation (e.g., a deformation operation) in the virtual scene and display the currently corresponding three-dimensional model.

Figure 3:
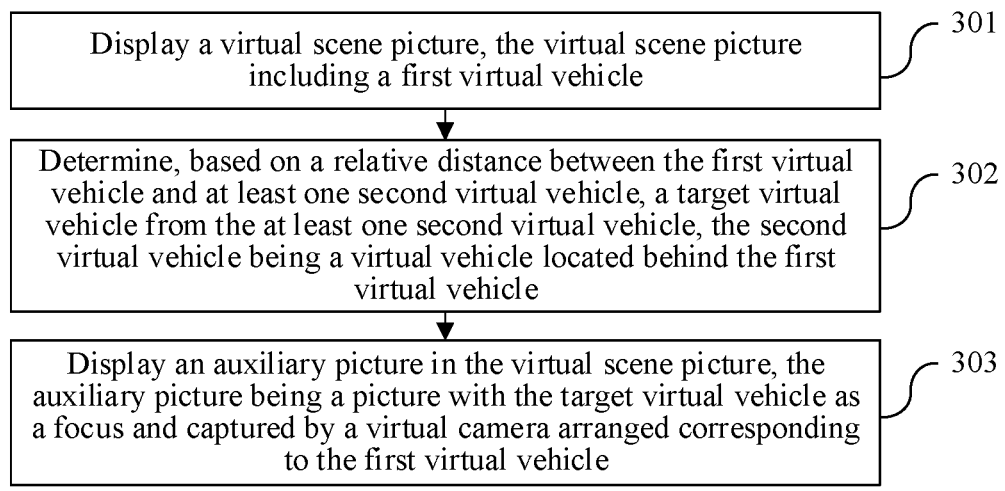
FIG. 3 is a flowchart of a method for displaying a picture in a virtual scene according to an embodiment of this disclosure.

FIG. 3 is a flowchart of a method for displaying a picture in a virtual scene according to an embodiment of this disclosure. The method may be performed by a computer device, and the computer device may be a terminal or a server. The computer device may alternatively include the terminal and the server. As shown in FIG. 3, the method for displaying a picture in a virtual scene includes the following steps:

Step 301: The computer device displays a virtual scene picture, the virtual scene picture including a first virtual vehicle. In an example, a virtual scene of a virtual environment is displayed.

Step 302: Determine, based on a relative distance between the first virtual vehicle and at least one second virtual vehicle, a target virtual vehicle from the at least one second virtual vehicle, the second virtual vehicle being a virtual vehicle located behind the first virtual vehicle. In an example, a target virtual vehicle of at least one second virtual vehicle is determined based on a distance between the first virtual vehicle and each of the at least one second virtual vehicle. Each of the at least one second virtual vehicle is located behind the first virtual vehicle in the virtual environment.

Step 303: Display an auxiliary picture in the virtual scene picture, the auxiliary picture being a picture with the target virtual vehicle as a focus and captured by a virtual camera arranged corresponding to the first virtual vehicle. In an example, an auxiliary picture is displayed in the virtual scene. The auxiliary picture is of the target virtual vehicle from a point of view associated with the first virtual vehicle.

According to the embodiments of this disclosure, the relative distance between the first virtual vehicle and the second virtual vehicle is detected in real time, the target virtual vehicle is determined, the virtual scene is captured by the virtual camera with the target virtual vehicle as the focus, and the captured auxiliary picture is displayed. Since the relative distance between the second virtual vehicle and the first virtual vehicle may change frequently, the target virtual vehicle corresponding to each moment can be flexibly determined through the foregoing solution, and the auxiliary picture with the target virtual vehicle as the focus is displayed. Therefore, the auxiliary picture can display effective pictures as much as possible, which improves the efficiency of the auxiliary picture in transmitting information beneficial to user operations, and may better ensure that the user can observe the effective picture content behind the vehicle while observing the picture in front of the virtual vehicle normally, thereby improving the interaction efficiency during control of the virtual vehicles, and improving the efficiency of human-computer interaction.

Figure 4:
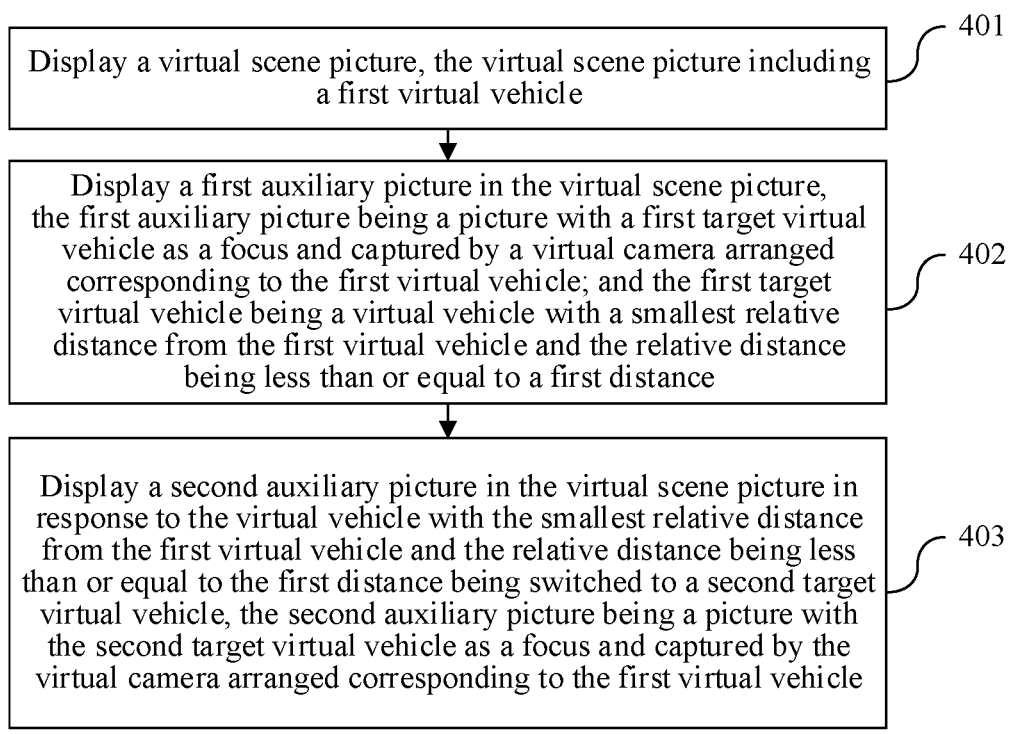
FIG. 4 is a flowchart of a method for displaying a picture in a virtual scene according to an embodiment of this disclosure.

FIG. 4 is a flowchart of a method for displaying a picture in a virtual scene according to an embodiment of this disclosure. The method may be performed by a computer device, and the computer device may be a terminal or a server. The computer device may alternatively include the terminal and the server. As shown in FIG. 4, the method for displaying a picture in a virtual scene includes the following steps:

Step 401: The computer device displays a virtual scene picture, the virtual scene picture including a first virtual vehicle.

Step 402: Display a first auxiliary picture in the virtual scene picture, the first auxiliary picture being a picture with a first target virtual vehicle as a focus and captured by a virtual camera arranged corresponding to the first virtual vehicle, and the first target virtual vehicle being a virtual vehicle with a smallest relative distance from the first virtual vehicle and the relative distance being less than or equal to a first distance.

Step 403: Display a second auxiliary picture in the virtual scene picture in response to the virtual vehicle with the smallest relative distance from the first virtual vehicle and the relative distance being less than or equal to the first distance being switched to a second target virtual vehicle, the second auxiliary picture being a picture with the second target virtual vehicle as a focus and captured by the virtual camera arranged corresponding to the first virtual vehicle.

Based on the above, according to the solution shown in this disclosure, the relative distance between the first virtual vehicle and the second virtual vehicle is detected in real time, the target virtual vehicle is determined, the virtual scene is captured by the virtual camera with the target virtual vehicle as the focus, and the captured auxiliary picture is displayed. Since the relative distance between the second virtual vehicle and the first virtual vehicle may change frequently, the target virtual vehicle corresponding to each moment can be flexibly determined through the foregoing solution, and the auxiliary picture with the target virtual vehicle as the focus is displayed. Therefore, the auxiliary picture can display effective pictures as much as possible, which improves the efficiency of the auxiliary picture in transmitting information beneficial to user operations, and may better ensure that the user can observe the effective picture content behind the vehicle while observing the picture in front of the virtual vehicle normally, thereby improving the interaction efficiency during control of the virtual vehicles by the user, and improving the efficiency of human-computer interaction.

Figure 5:
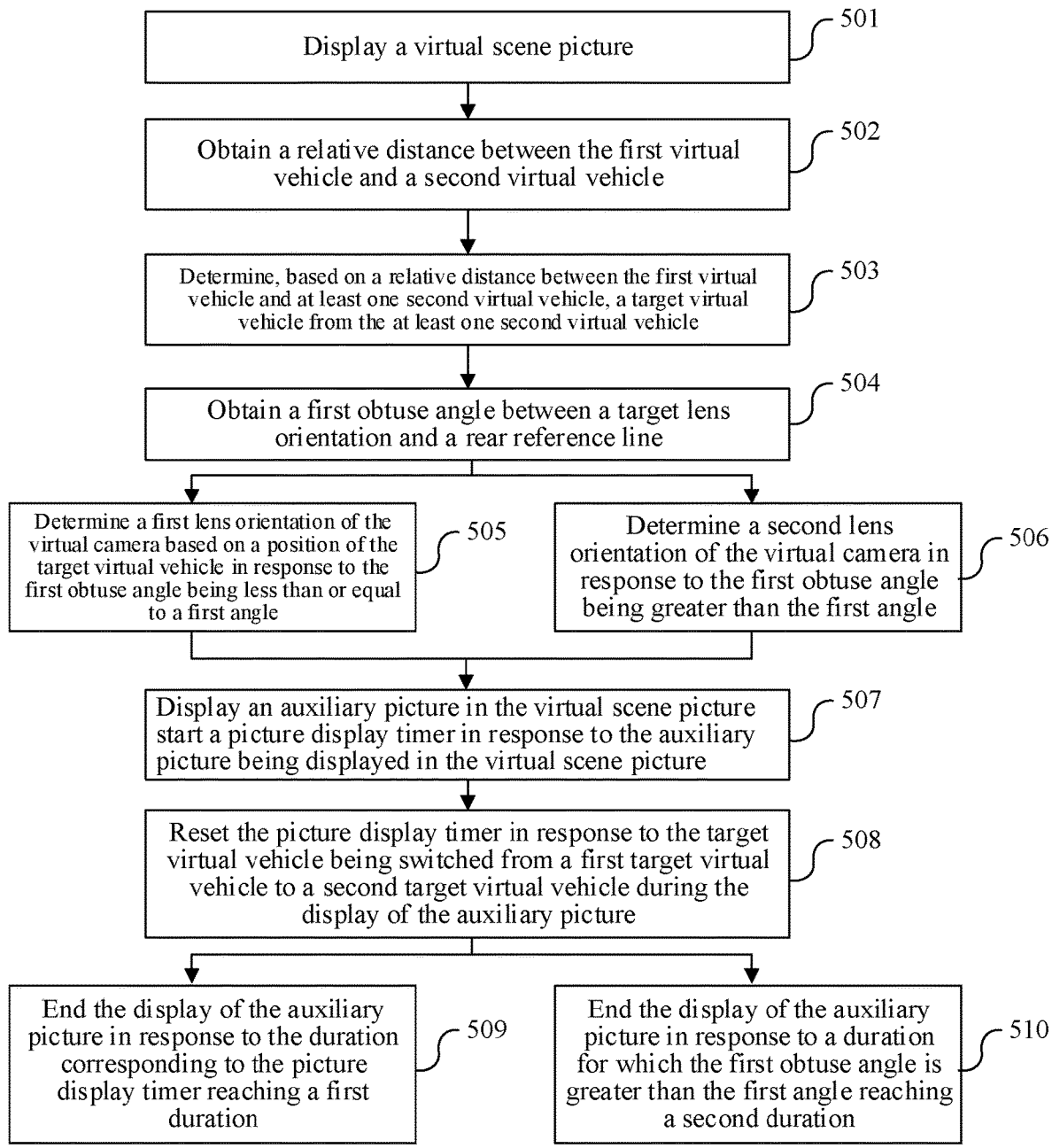
FIG. 5 is a flowchart of a method for displaying a picture in a virtual scene according to an embodiment of this disclosure.

FIG. 5 is a flowchart of a method for displaying a picture in a virtual scene according to an embodiment of this disclosure. The method may be performed by a computer device, and the computer device may be a terminal or a server. The computer device may alternatively include the terminal and the server. As shown in FIG. 5, taking the computer device as a terminal as an example, the terminal may display an auxiliary picture in a virtual scene picture by performing the following steps:

Step 501: The computer device displays a virtual scene picture.

In this embodiment of this disclosure, the terminal displays the virtual scene picture including a first virtual vehicle.

The virtual scene picture may be a virtual scene that includes the first virtual vehicle that competes with other virtual vehicles. The first virtual vehicle is a virtual vehicle controlled by the terminal, and other virtual vehicles may be virtual vehicles controlled by other terminals or AI-controlled.

In some embodiments, the virtual scene picture is a virtual scene picture observed from a third-person perspective of the first virtual vehicle. The third-person perspective of the first virtual vehicle is a perspective corresponding to a main picture virtual camera arranged at the rear and upper part of the first virtual vehicle, and the virtual scene picture observed from the third-person perspective of the first virtual vehicle is a virtual scene picture observed by the main picture virtual camera arranged at the rear and upper part of the first virtual vehicle.

Alternatively, the virtual scene picture is a virtual scene picture observed from a first-person perspective of the first virtual vehicle. The first-person perspective of the first virtual vehicle is a perspective corresponding to a main picture virtual camera arranged at a driver position of the first virtual vehicle, and the virtual scene picture observed from the first-person perspective of the first virtual vehicle is a virtual scene picture observed by the main picture virtual camera arranged at the driver position of the first virtual vehicle.

In some embodiments, the virtual scene picture covers a display region of the terminal. The virtual scene picture is a main display picture when the first virtual vehicle is controlled to perform a racing competition in the virtual scene, and is used for displaying a path picture of the first virtual vehicle during the racing competition. The user controls the first virtual vehicle based on, for example by obtaining, the path picture ahead.

Controls or display information are superimposed on the virtual scene picture.

For example, the controls may include a direction control for receiving a trigger operation to control a moving direction of the first virtual vehicle, a brake control for receiving a trigger operation to control the first virtual vehicle to brake, and an acceleration control for controlling the first virtual vehicle to accelerate and move. The displayed information may include account identifiers used for indicating the first virtual vehicle and other virtual vehicles, ranking information of an order of locations of the virtual vehicles at the current moment, a map used for indicating the complete virtual scene, brief map information of locations of the virtual vehicles on the map, and the like.

In some embodiments, a perspective switching control is superimposed on the virtual scene picture. In response to a specific operation of the user on the perspective switching control, the virtual scene picture may be switched between the first-person perspective of the first virtual vehicle and the third-person perspective of the first virtual vehicle.

For example, when the virtual scene picture displayed by the terminal is a virtual scene picture corresponding to the first-person perspective of the first virtual vehicle, the terminal switches, in response to the specific operation of the user on the perspective switching control, the virtual scene picture corresponding to the first-person perspective of the first virtual vehicle to the virtual scene picture corresponding to the third-person perspective. When the virtual scene picture displayed by the terminal is a virtual scene picture corresponding to the third-person perspective of the first virtual vehicle, the terminal switches, in response to the specific operation of the user on the perspective switching control, the virtual scene picture corresponding to the third-person perspective of the first virtual vehicle to the virtual scene picture corresponding to the first-person perspective.

In some embodiments, virtual vehicles corresponding to the same user account may be a plurality of virtual vehicles of different types, and the terminal displays, on a vehicle selection interface in response to receiving virtual vehicle information sent by the server, virtual vehicles of different types corresponding to the virtual vehicle information. In response to receiving a selection operation of the user on the vehicle selection interface, a target virtual vehicle corresponding to the selection operation is determined, and the target virtual vehicle is determined as the first virtual vehicle. Similarly, the server receives a specified virtual scene identifier, and displays the corresponding virtual scene on the terminal.

Step 502: Obtain a relative distance between the first virtual vehicle and a second virtual vehicle.

In this embodiment of this disclosure, the terminal obtains the relative distance between the first virtual vehicle and each second virtual vehicle, and the second virtual vehicle is a virtual vehicle located behind the first virtual vehicle.

In some embodiments, a rear reference line of the first virtual vehicle is obtained, a region not exceeding the rear reference line is determined as the rear of the first virtual vehicle, and each virtual vehicle behind the first virtual vehicle is determined as the second virtual vehicle.

The rear reference line of the first virtual vehicle is a straight line on which a rear of the first virtual vehicle is located, and the rear reference line is parallel to the horizontal plane in the virtual scene and perpendicular to a line connecting a head and the rear of the first virtual vehicle.

In some embodiments, a length of a line connecting a rear of the first virtual vehicle and a center point of the second virtual vehicle is determined as the relative distance.

The center point of the second virtual vehicle may be the center of gravity of the virtual vehicle. In addition, the calculated relative distance may refer to a distance in the virtual scene.

Step 503: Determine, based on a relative distance between the first virtual vehicle and at least one second virtual vehicle, a target virtual vehicle from the at least one second virtual vehicle.

In this embodiment of this disclosure, the terminal determines whether the relative distance satisfies a specified condition based on the determined relative distance between each second virtual vehicle and the first virtual vehicle, and when the relative distance satisfies the specified condition, determines that the second virtual vehicle corresponding to the relative distance is the target virtual vehicle. If there is no relative distance that satisfies the specified condition, there is no target virtual vehicle at the current moment.

In some embodiments, at the same moment, there is only one target virtual vehicle, or there is no target virtual vehicle.

In some embodiments, a second virtual vehicle that simultaneously satisfies that a relative distance from the first virtual vehicle is less than or equal to a first distance and that the relative distance is the smallest is determined as the target virtual vehicle.

1) First, obtain candidate virtual vehicles, and determine a target virtual vehicle from the candidate virtual vehicles. A candidate virtual vehicle with a smallest relative distance from the first virtual vehicle is then determined as the target virtual vehicle.

The candidate virtual vehicles are the second virtual vehicles whose relative distances from the first virtual vehicle are less than or equal to a first distance. The candidate virtual vehicles may be a set of partial second virtual vehicles with relative distances less than or equal to the first distance.

For example, if the first distance is 100 m, when it is obtained that second virtual vehicles with relative distances from the first virtual vehicle less than or equal to 100 m behind the first virtual vehicle in the virtual scene are a virtual vehicle A, a virtual vehicle B, and a virtual vehicle C, the virtual vehicle A, the virtual vehicle B, and the virtual vehicle C are obtained as candidate virtual vehicles. The relative distances between the three candidate virtual vehicles and the first virtual vehicle are compared. If the relative distance corresponding to the virtual vehicle A is 60 m, the relative distance corresponding to the virtual vehicle B is 30 m, and the relative distance corresponding to the virtual vehicle C is 100 m, the virtual vehicle B with the smallest relative distance is determined as the target virtual vehicle.

2) First, obtain the second virtual vehicle with a smallest relative distance from the first virtual vehicle, and determine the second virtual vehicle as the target virtual vehicle in response to the relative distance between the second virtual vehicle and the first virtual vehicle being less than or equal to a first distance.

For example, when a virtual vehicle A, a virtual vehicle B, and a virtual vehicle C are obtained behind the first virtual vehicle in the virtual scene, relative distances between the virtual vehicle A, the virtual vehicle B, and the virtual vehicle C respectively and the first virtual vehicle are obtained. The relative distances between the three candidate virtual vehicles and the first virtual vehicle are compared. If the relative distance corresponding to the virtual vehicle A is 105 m, the relative distance corresponding to the virtual vehicle B is 110 m, and the relative distance corresponding to the virtual vehicle C is 120 m, it is determined that the virtual vehicle with the smallest relative distance is the virtual vehicle A. It is further determined whether the relative distance of the virtual vehicle A is less than or equal to the first distance. If the first distance is 100 m, it is determined that the virtual vehicle A does not meet the requirements, and there is no target virtual vehicle at the current moment. If the first distance is 105 m, it is determined that the virtual vehicle A meets the condition of being less than or equal to the first distance, and it is determined that the target virtual vehicle at the current moment is the virtual vehicle A.

Step 504: Obtain a first obtuse angle between a target lens orientation and a rear reference line.

In this embodiment of this disclosure, a virtual camera for capturing an auxiliary picture is provided diagonally above the first virtual vehicle, and the virtual camera moves with the first virtual vehicle. The terminal obtains a first obtuse angle between a target lens orientation corresponding to the virtual camera and the rear reference line of the first virtual vehicle.

The target lens orientation is a direction from the virtual camera to a center point of the target virtual vehicle. The rear reference line is a straight line on which a rear of the first virtual vehicle is located, and the rear reference line is parallel to the horizontal plane and perpendicular to a line connecting a head and the rear of the first virtual vehicle.

Figure 6:
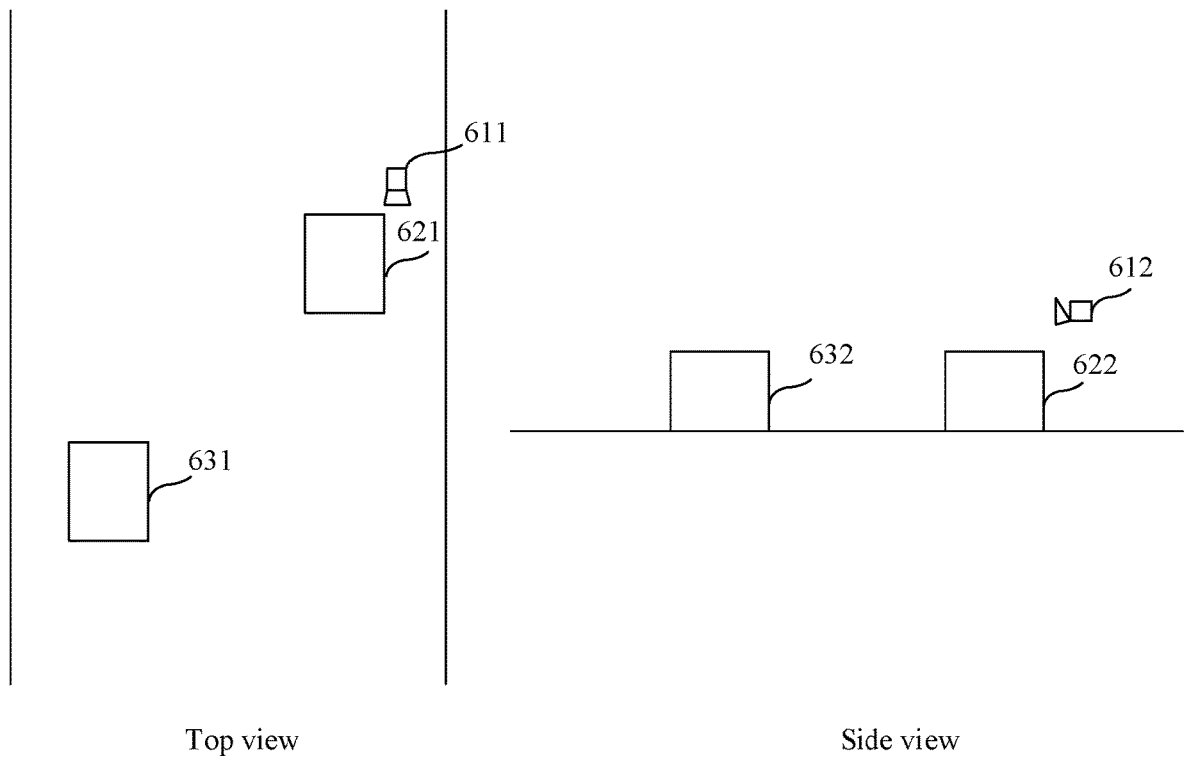
FIG. 6 is a schematic diagram of a setting position of a virtual camera for capturing an auxiliary picture according to an embodiment of this disclosure.

For example, FIG. 6 is a schematic diagram of a setting position of a virtual camera for capturing an auxiliary picture according to an embodiment of this disclosure. As shown in FIG. 6, when there is a first virtual vehicle 621 and a target virtual vehicle 631 in a virtual scene, it may be determined through the top view that a virtual camera 611 is located in the right front of the first virtual vehicle 621. If there is a first virtual vehicle 622 and a target virtual vehicle 632 in the virtual scene, it may be determined from the side view that the virtual camera 612 is located in front of and above the first virtual vehicle 622.

The virtual camera may be alternatively located at the upper left front of the first virtual object.

Figure 7:
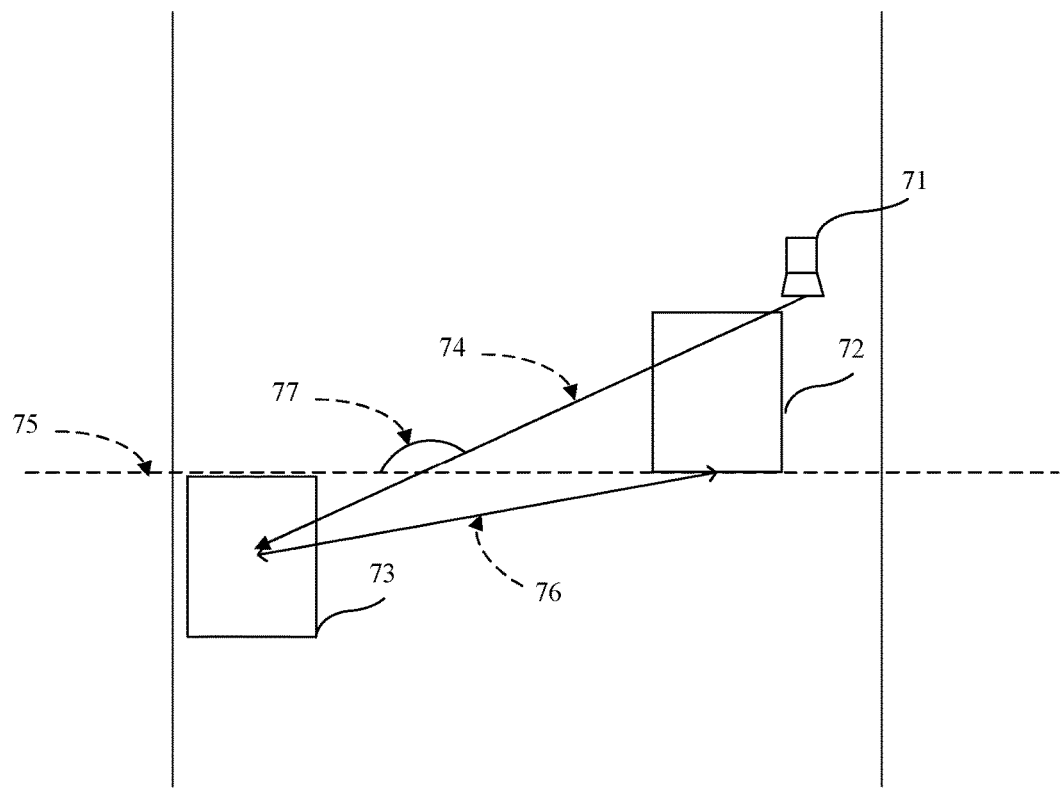
FIG. 7 is a schematic diagram of a process of determining an obtuse angle between a target lens orientation and a rear reference line according to an embodiment of this disclosure.

For example, FIG. 7 is a schematic diagram of a process of determining an obtuse angle between a target lens orientation and a rear reference line according to an embodiment of this disclosure. As shown in FIG. 7, a rear of a first virtual vehicle 72 and a center point of a second virtual vehicle 73 are connected, to determine a relative distance 76 between the first virtual vehicle 72 and the second virtual vehicle. It may be determined according to the relative distance that the second virtual vehicle is a target virtual vehicle 73. Through the rear of the first virtual vehicle 72, a straight line parallel to the horizontal plane and perpendicular to a line connecting the head and rear of the vehicle is drawn. The straight line is obtained as a rear reference line 75 of the first virtual vehicle 72, and is then connected to the center point of the target virtual vehicle 73 through a virtual camera 71, where the direction of the connection line is used as a target lens orientation 74 of the virtual camera 71. The intersection between the target lens orientation 74 and the rear reference line 75 of the first virtual vehicle 72 forms four included angles, including two acute angles and two obtuse angles, where the angles of the two acute angles are the same, and the angles of the two obtuse angles are the same, a first obtuse angle 77 of which is obtained.

Step 505: Determine a first lens orientation of the virtual camera based on a position of the target virtual vehicle in response to the first obtuse angle being less than or equal to a first angle.

In this embodiment of this disclosure, in response to the first obtuse angle obtained by the terminal being less than or equal to the first angle, the first lens orientation of the virtual camera is determined based on the position of the target virtual vehicle, where the first lens orientation is a lens orientation in which the virtual camera actually captures the virtual scene.

In some embodiments, in response to the first obtuse angle obtained by the terminal being less than or equal to the first angle, the first lens orientation is determined as the target lens orientation.

Figure 8:
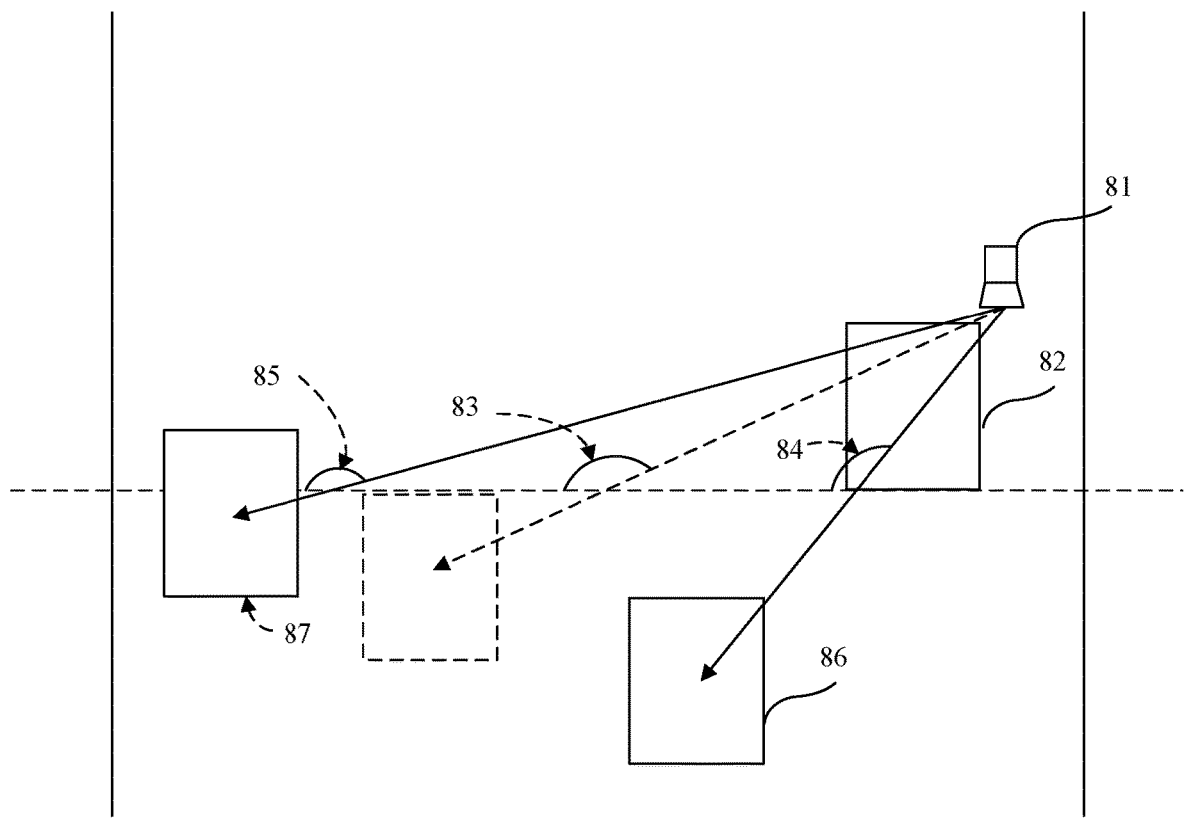
FIG. 8 is a schematic diagram of a process of determining a lens orientation according to an embodiment of this disclosure.

For example, FIG. 8 is a schematic diagram of a process of determining a lens orientation according to an embodiment of this disclosure. As shown in FIG. 8, if a first angle 83 is 165 degrees, when a target virtual vehicle moves to the position of the dotted line in the figure, a first obtuse angle formed by the intersection between a target lens orientation and a rear reference line of a first virtual vehicle 82 is 165 degrees. When the target virtual vehicle 86 is in the position as shown in the figure, the intersection between the target lens orientation and the rear reference line of the first virtual vehicle 82 forms a first obtuse angle 84. The first obtuse angle 84 is compared with the first angle 83, and it may be determined that the first obtuse angle 84 is less than the first angle 83, so that the first lens orientation is determined as the target lens orientation.

Step 506: Determine a second lens orientation of the virtual camera in response to the first obtuse angle being greater than the first angle.

In this embodiment of this disclosure, if the first obtuse angle obtained by the terminal is greater than the first angle, the second lens orientation of the virtual camera is determined to be a lens orientation in which the virtual camera actually captures the virtual scene.

In some embodiments, the second lens orientation points between the target lens orientation and a rear pointing direction, a second obtuse angle between the second lens orientation and the rear reference line is the first angle, and the rear pointing direction is a direction from the head to the rear of the first virtual vehicle.

For example, as shown in FIG. 8, if a first angle 83 is 165 degrees, when a target virtual vehicle moves to the position of the dotted line in the figure, a second obtuse angle formed by the intersection between a target lens orientation and a rear reference line of a first virtual vehicle 82 is 165 degrees. When the target virtual vehicle 87 is in the position as shown in the figure, the intersection between the target lens orientation and the rear reference line of the first virtual vehicle 82 forms a first obtuse angle 85. The first obtuse angle 85 is compared with the first angle 83, and it may be determined that the first obtuse angle 85 is greater than the first angle 83, so that the first lens orientation is determined as the target lens orientation corresponding to the second obtuse angle being the first angle.

Step 507: Start a picture display timer in response to the auxiliary picture being displayed in the virtual scene picture.

In this embodiment of this disclosure, when the auxiliary picture is displayed in the virtual scene picture, the picture display timer is started.

The picture display timer is configured to record a duration of continuous display of the auxiliary picture in the virtual scene picture. Alternatively, the picture display timer may be configured to record a duration of display of the auxiliary picture with the same focus.

In some embodiments, in response to determining that a target virtual vehicle exists among the second virtual vehicles, the auxiliary picture is displayed in the virtual scene picture, and meanwhile, the timing function of the picture display timer is started, to record the display duration of the auxiliary picture.

The auxiliary picture may be displayed in any region on the virtual scene picture, and the size of the auxiliary picture can be adjusted. The user may customize or select, in a picture setting interface, the position of the auxiliary picture on the virtual scene picture and the display size of the auxiliary picture.

In some embodiments, in response to existence of a target virtual vehicle, the picture display timer is used for timing. If the terminal receives feedback that the target virtual vehicle does not exist at this moment, the timing function of the picture display timer is ended and the picture display timer is reset.

For example, the terminal determines the target virtual vehicle through calculation at a specific moment, starts the picture display timer, and starts timing. When the duration of the continuous determination of the target virtual vehicle is 3 s, the duration of the timing through the picture display timer is 3 s. After 5 s, if the target virtual vehicle exceeds the first virtual vehicle, and it is determined through calculation that there is no virtual vehicle that meets the conditions of being a target virtual vehicle, the timing function of the picture display timer is ended, and the timing duration of the timer is reset to zero.

In some embodiments, the auxiliary picture is displayed in the virtual scene picture in response to a display time of the virtual scene picture being greater than a third duration.

Timing is performed through the timer at a moment when display of the virtual scene picture is started. When the duration recorded by the timer is within a third duration, the terminal does not determine a target virtual object. When the duration recorded by the timer exceeds the third duration, the terminal starts the step of detecting and determining a target virtual vehicle in real time.

For example, taking an automobile racing game as an example, when each virtual vehicle enters the game, the game countdown is automatically started. When the countdown is over, an automobile racing timing mode is officially started. Within a third duration after the automobile racing timing mode is started, the auxiliary picture is not displayed, or the calculation and determination step of the target virtual vehicle is not performed. When a start duration of the automobile racing mode exceeds the third duration, the display of the auxiliary picture is started based on the target virtual vehicle.

In some embodiments, in response to a distance between an initial moving position and a current position of the first virtual vehicle being greater than a specified distance, the auxiliary picture is displayed in the virtual scene picture.

Since each virtual vehicle starts to move from the same starting line at the starting point, the target virtual object may change frequently in the starting stage. The foregoing two methods are used for controlling that the auxiliary picture is not displayed when the first virtual vehicle is near the starting point, which can avoid meaningless display of the auxiliary picture, thereby saving terminal resources.

In some embodiments, a lens orientation of the virtual camera is maintained in response to the relative distance between the target virtual vehicle and the first virtual vehicle being less than or equal to a second distance; and the auxiliary picture in the lens orientation captured by the virtual camera is displayed in the virtual scene picture.

When the relative distance between the first virtual vehicle and the target virtual vehicle is very short and reaches a minimum effective distance corresponding to the lens of the virtual camera, that is, a second distance, the lens of the virtual camera stops following the position of the target virtual vehicle to move, and keeps still. The lens focus of the virtual camera is still the target virtual vehicle. If the relative distance between the target virtual vehicle and the first virtual vehicle becomes larger than the second distance, the lens orientation of the virtual camera continues to follow the target virtual vehicle to move.

Step 508: Reset the picture display timer in response to the target virtual vehicle being switched from a first target virtual vehicle to a second target virtual vehicle during the display of the auxiliary picture.

In this embodiment of this disclosure, when the auxiliary picture is displayed in the virtual scene picture, during the movement of each virtual vehicle, when the virtual vehicle behind the first virtual vehicle with the smallest relative distance from the first virtual vehicle changes from a first target virtual vehicle to a second target virtual vehicle, the picture display timer needs to be reset to zero.

The first target virtual vehicle and the second target virtual vehicle are any two of the at least one second virtual vehicle.

In some embodiments, after the target virtual vehicle is switched from the first target virtual vehicle to the second target virtual vehicle, the focus of the virtual camera is switched from the first target virtual vehicle to the second target virtual vehicle.

When the target virtual vehicle is switched from the first target virtual vehicle to the second target virtual vehicle, the virtual scene displayed in the auxiliary picture is switched from the picture captured with the first target virtual vehicle as the focus to the picture captured with the second target virtual vehicle as the focus.

Figure 9:
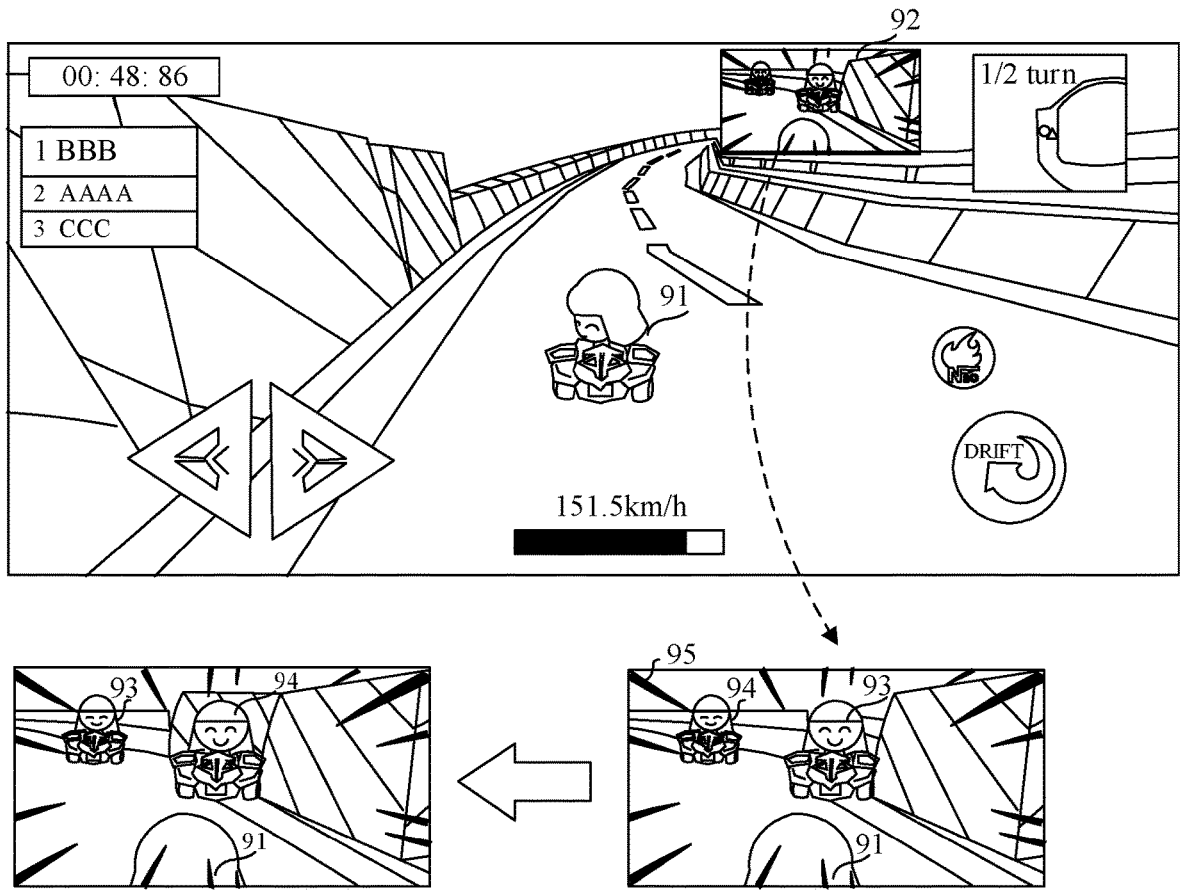
FIG. 9 is a schematic diagram of switching a focus corresponding to an auxiliary picture according to an embodiment of this disclosure.

For example, taking an automobile racing game as an example, FIG. 9 is a schematic diagram of switching a focus corresponding to an auxiliary picture according to an embodiment of this disclosure. As shown in FIG. 9, if there are a first target virtual vehicle 93 and a second target virtual vehicle 94 behind a first virtual vehicle 91, an auxiliary picture 92 is displayed on the current virtual scene picture. Since a relative distance between the first target virtual vehicle 93 and the first virtual vehicle is the smallest, the auxiliary picture 92 is a picture captured with the first target virtual vehicle 93 as a focus. If the second target virtual vehicle 94 exceeds the first target virtual vehicle 93 at a later moment and becomes the virtual vehicle with the smallest relative distance from the first virtual vehicle, the focus of the virtual camera is switched to the second target virtual vehicle for picture capture.

In some embodiments, a line pattern for indicating a sprint effect is added to the auxiliary picture.

For example, as shown in FIG. 9, a line pattern 95 of the sprint effect is at an edge of the auxiliary picture 92. The line pattern 95 of the sprint effect is added, so that the sense of tension of the user can be enhanced, thereby improving the operating experience for the user.

Step 509: End the display of the auxiliary picture in response to the duration corresponding to the picture display timer reaching a first duration.

In this embodiment of this disclosure, when the terminal obtains that the duration recorded by the picture display timer reaches the first duration, the display of the auxiliary picture on the virtual scene picture is ended.

In other words, the picture display timer is reset in response to the target virtual vehicle being switched from a first target virtual vehicle to a second target virtual vehicle during the display of the auxiliary picture. Only when the focus of the virtual camera continues to be maintained on the same virtual vehicle for a duration reaching the first duration, the display of the auxiliary picture on the virtual scene picture is ended.

Through the foregoing solution, the virtual vehicle as the focus can be adjusted in real time during the display of the auxiliary picture, and the display can be continuously performed through a smooth picture, which is beneficial for the user to obtain effective position information of rear virtual vehicles through the auxiliary picture during the operation.

Step 510: End the display of the auxiliary picture in response to a duration for which the first obtuse angle is greater than the first angle reaching a second duration.

In this embodiment of this disclosure, the display of the auxiliary picture may also be ended in response to a duration for which the first obtuse angle between the target lens orientation and the rear reference line is greater than the first angle reaching a second duration.

In some embodiments, when the lens orientation of the virtual camera turns to the maximum angle, the target virtual vehicle is partially in the auxiliary picture or not in the auxiliary picture. Therefore, for the auxiliary picture to display meaningful picture content as much as possible, only when the lens orientation of the virtual camera turns to the maximum angle for a duration reaching the second duration, the display of the auxiliary picture is ended.

The second duration may be less than the first duration. That is, compared with the solution shown in step 509, ending the auxiliary picture in the foregoing manner can end the display of the auxiliary picture earlier.

Figure 10:
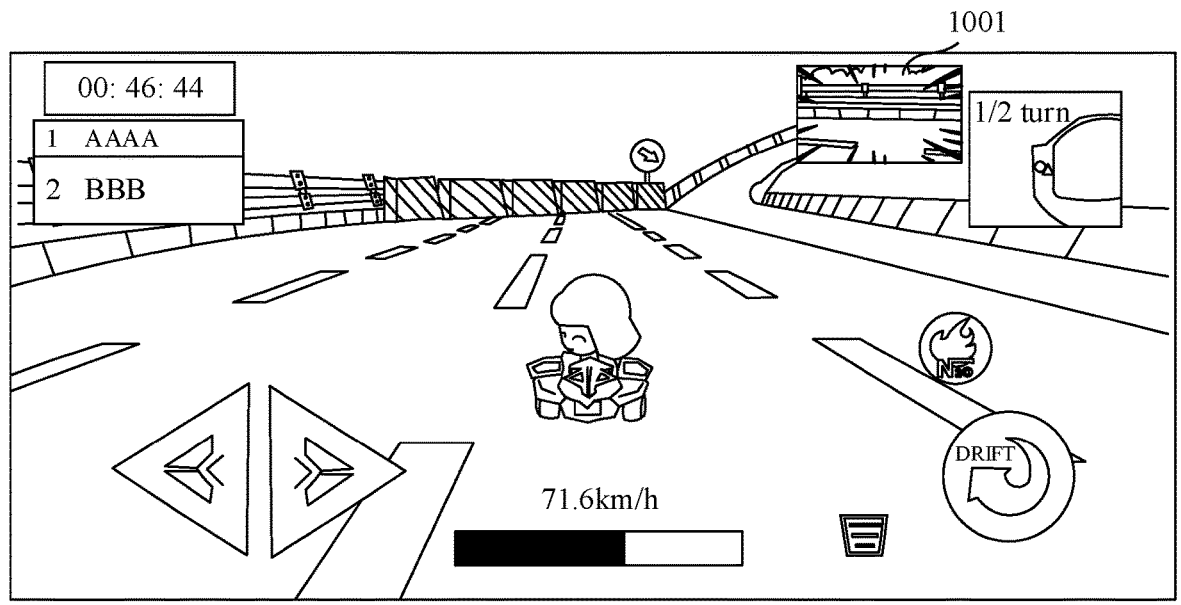
FIG. 10 is a schematic diagram of an auxiliary picture when a first obtuse angle between a target lens orientation and a rear reference line is greater than a first angle according to an embodiment of this disclosure.

For example, FIG. 10 is a schematic diagram of an auxiliary picture when a first obtuse angle between a target lens orientation and a rear reference line is greater than a first angle according to an embodiment of this disclosure. As shown in FIG. 10, the target virtual vehicle behind the first virtual vehicle is in an overtaking state, and the first obtuse angle corresponding to the target virtual vehicle is greater than the first angle. Therefore, there is no target virtual vehicle in a displayed auxiliary picture 1001, only including a picture of the track edge. Using the auxiliary picture 1001 to display the track edge picture has no actual gain to the user operation. Therefore, if the auxiliary picture 1001 is still ended when the display duration reaches the first duration, terminal resources are wasted.

According to the embodiments of this disclosure, the relative distance between the first virtual vehicle and the second virtual vehicle is detected in real time, the target virtual vehicle is determined, the virtual scene is captured by the virtual camera with the target virtual vehicle as the focus, and the captured auxiliary picture is displayed. Since the relative distance between the second virtual vehicle and the first virtual vehicle may change frequently, the target virtual vehicle corresponding to each moment can be flexibly determined through the foregoing solution, and the auxiliary picture with the target virtual vehicle as the focus is displayed. Therefore, the auxiliary picture can display effective pictures as much as possible, which improves the efficiency of the auxiliary picture in transmitting information beneficial to user operations, and may better ensure that the user can observe the effective picture content behind the vehicle while observing the picture in front of the virtual vehicle normally, thereby improving the interaction efficiency during control of the virtual vehicles by the user, and improving the efficiency of human-computer interaction.

Figure 11:
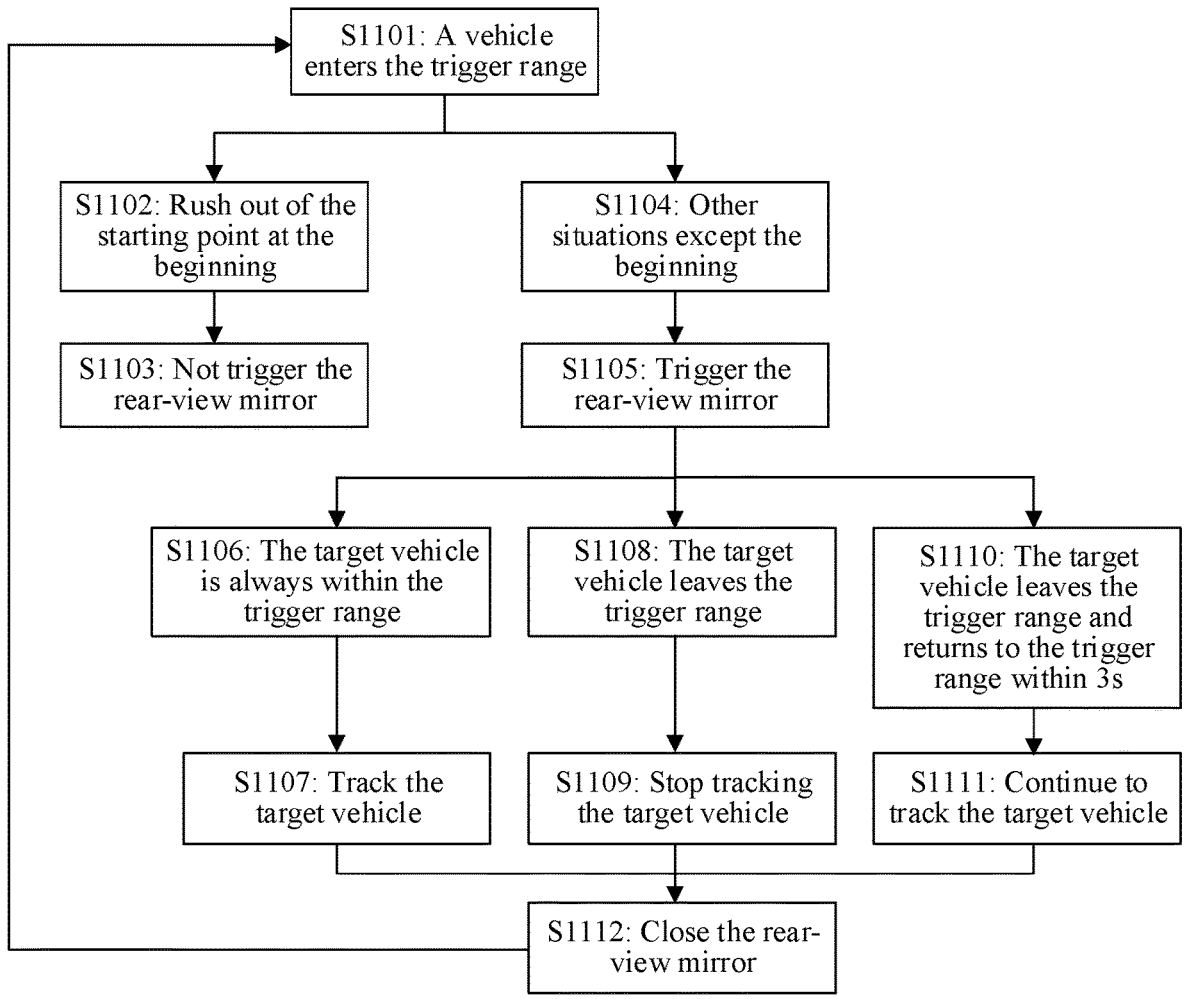
FIG. 11 is a flowchart of a method for displaying a picture in a virtual scene according to an embodiment of this disclosure.

Using an example in which the virtual scene is a virtual scene in an automobile racing game, FIG. 11 is a flowchart of a method for displaying a picture in a virtual scene according to an embodiment of this disclosure. As shown in FIG. 11, the logical flowchart may include the following steps:

The terminal detects whether there are other virtual vehicles within a trigger range of a first virtual vehicle, where the trigger range may be a range behind the first virtual vehicle and with a relative distance less than a first distance; and determines, when detecting that there are other virtual vehicles within the trigger range, a current state of the first virtual vehicle (S1101). If it is determined that the first virtual vehicle is currently in a state of rushing out of the starting point at the beginning (S1102), a rear-view mirror function is not triggered, where the rear-view mirror function is a function of displaying an auxiliary picture (S1103). If it is determined that the first virtual vehicle is not currently in the state of rushing out of the starting point at the beginning (S1104), it is determined that the rear-view mirror function is triggered (S1105). If it is determined through real-time detection that a target virtual vehicle is always within the trigger range of the first virtual vehicle (S1106), a virtual camera is used to track and capture a picture of the target virtual vehicle (S1107). If the target virtual vehicle leaves the trigger range corresponding to the first virtual vehicle during the capturing (S1108), the virtual camera is controlled to stop tracking and capturing the target virtual vehicle (S1109). If the target virtual vehicle leaves the trigger range and returns to the trigger range of the first virtual vehicle within a specified time (for example, 3 s) (S1110), the virtual camera is continuously controlled to track and capture the picture of the target virtual vehicle (S1111). If a display duration of the auxiliary picture reaches a specified maximum display duration, which may be, for example, 3 s, the rear-view mirror function is controlled to be ended, and the display of the auxiliary picture is ended (S1112).

According to the embodiments of this disclosure, the relative distance between the first virtual vehicle and the second virtual vehicle is detected in real time, the target virtual vehicle is determined, the virtual scene is captured by the virtual camera with the target virtual vehicle as the focus, and the captured auxiliary picture is displayed. Since the relative distance between the second virtual vehicle and the first virtual vehicle may change frequently, the target virtual vehicle corresponding to each moment can be flexibly determined through the foregoing solution, and the auxiliary picture with the target virtual vehicle as the focus is displayed. Therefore, the auxiliary picture can display effective pictures as much as possible, which improves the efficiency of the auxiliary picture in transmitting information beneficial to user operations, and may better ensure that the user can observe the effective picture content behind the vehicle while observing the picture in front of the virtual vehicle normally, thereby improving the interaction efficiency during control of the virtual vehicles by the user, and improving the efficiency of human-computer interaction.

Figure 12:
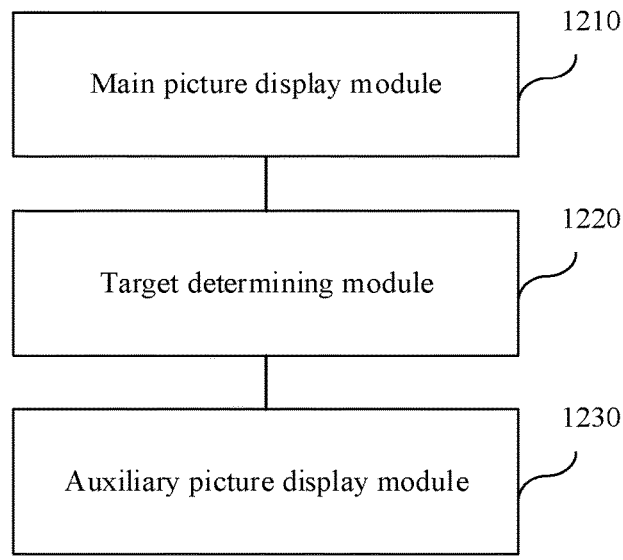
FIG. 12 is a structural block diagram of an apparatus for displaying a picture in a virtual scene according to an embodiment of this disclosure.

FIG. 12 is a structural block diagram of an apparatus for displaying a picture in a virtual scene according to an embodiment of this disclosure. The apparatus for displaying a picture in a virtual scene may be arranged in a computer device, to perform all or some steps performed in the method shown in the embodiment corresponding to FIG. 3 or FIG. 5. The apparatus for displaying a picture in a virtual scene may include a main picture display module 1210, a target determining module 1220, and an auxiliary picture display module 1230. One or more modules, submodules, and/or units of the apparatus can be implemented by processing circuitry, software, or a combination thereof, for example.

The main picture display module 1210 is configured to display a virtual scene picture, the virtual scene picture including a first virtual vehicle. The target determining module 1220 is configured to determine, based on a relative distance between the first virtual vehicle and at least one second virtual vehicle, a target virtual vehicle from the at least one second virtual vehicle, the second virtual vehicle being a virtual vehicle located behind the first virtual vehicle. The auxiliary picture display module 1230 is configured to display an auxiliary picture in the virtual scene picture, the auxiliary picture being a picture with the target virtual vehicle as a focus and captured by a virtual camera arranged corresponding to the first virtual vehicle.

In some embodiments, the target determining module 1220 includes a candidate obtaining submodule and a first target determining submodule. The candidate obtaining submodule is configured to obtain candidate virtual vehicles, where the candidate virtual vehicles are the second virtual vehicles whose relative distances from the first virtual vehicle are less than or equal to a first distance. The first target determining submodule is configured to determine the target virtual vehicle from the candidate virtual vehicles.

In some embodiments, the target determining submodule includes a target determining unit that is configured to determine the candidate virtual vehicle with a smallest relative distance from the first virtual vehicle as the target virtual vehicle.

In some embodiments, the target determining module 1220 includes a first obtaining submodule and a second target determining submodule. The first obtaining submodule is configured to obtain the second virtual vehicle with a smallest relative distance from the first virtual vehicle. The second target determining submodule is configured to determine the second virtual vehicle as the target virtual vehicle in response to the relative distance between the second virtual vehicle and the first virtual vehicle being less than or equal to a first distance.

In some embodiments, the apparatus further includes a distance obtaining module that is configured to obtain the relative distance between the first virtual vehicle and the at least one second virtual vehicle before the determining, based on a relative distance between the first virtual vehicle and at least one second virtual vehicle, a target virtual vehicle from the at least one second virtual vehicle.

In some embodiments, the distance obtaining module includes a distance obtaining submodule that is configured to determine a length of a line connecting a rear of the first virtual vehicle and a center point of the second virtual vehicle as the relative distance.

In some embodiments, the apparatus further includes a timing module and a first picture ending module. The timing module is configured to start a picture display timer in response to the auxiliary picture being displayed in the virtual scene picture, where the picture display timer is configured to record a duration of continuous display of the auxiliary picture in the virtual scene picture. The first picture ending module is configured to end the display of the auxiliary picture in response to the duration corresponding to the picture display timer reaching a first duration.

In some embodiments, the apparatus further includes a timing reset module that is configured to reset, before the ending the display of the auxiliary picture in response to the duration corresponding to the picture display timer reaching a first duration, the picture display timer in response to the target virtual vehicle being switched from a first target virtual vehicle to a second target virtual vehicle during the display of the auxiliary picture, where the first target virtual vehicle and the second target virtual vehicle are any two of the at least one second virtual vehicle.

In some embodiments, the virtual camera is located obliquely above the first virtual vehicle, and the virtual camera moves with the first virtual vehicle. Further, the apparatus further includes an obtuse angle obtaining module and a first direction determining module.

The obtuse angle obtaining module is configured to obtain, before the displaying an auxiliary picture in the virtual scene picture, a first obtuse angle between a target lens orientation and a rear reference line, where the target lens orientation is a direction from the virtual camera to a center point of the target virtual vehicle, the rear reference line is a straight line on which a rear of the first virtual vehicle is located, and the rear reference line is parallel to the horizontal plane and perpendicular to a line connecting a head and the rear of the first virtual vehicle. The first direction determining module is configured to determine a first lens orientation of the virtual camera based on a position of the target virtual vehicle at a current moment in response to the first obtuse angle being less than or equal to a first angle, where the first lens orientation is the target lens orientation.

In some embodiments, the apparatus further includes a second direction determining module that is configured to determine a second lens orientation of the virtual camera in response to the first obtuse angle being greater than the first angle, where the second lens orientation points between the target lens orientation and a rear pointing direction, a second obtuse angle between the second lens orientation and the rear reference line is the first angle, and the rear pointing direction is a direction from the head to the rear of the first virtual vehicle.

In some embodiments, the apparatus further includes a second picture ending module that is configured to end the display of the auxiliary picture in response to a duration for which the first obtuse angle between the target lens orientation and the rear reference line is greater than the first angle reaching a second duration.

In some embodiments, the auxiliary picture display module 1230 includes a direction determining submodule and a picture capturing submodule.

The direction determining submodule is configured to maintain a lens orientation of the virtual camera in response to the relative distance between the target virtual vehicle and the first virtual vehicle being less than or equal to a second distance. The picture capturing submodule is configured to display, in the virtual scene picture, the auxiliary picture in the lens orientation captured by the virtual camera.

In some embodiments, the auxiliary picture display module 1230 includes an auxiliary picture display submodule that is configured to display the auxiliary picture in the virtual scene picture in response to a display time of the virtual scene picture being greater than a third duration.

According to the embodiments of this disclosure, the relative distance between the first virtual vehicle and the second virtual vehicle is detected in real time, the target virtual vehicle is determined, the virtual scene is captured by the virtual camera with the target virtual vehicle as the focus, and the captured auxiliary picture is displayed. Since the relative distance between the second virtual vehicle and the first virtual vehicle may change frequently, the target virtual vehicle corresponding to each moment can be flexibly determined through the foregoing solution, and the auxiliary picture with the target virtual vehicle as the focus is displayed. Therefore, the auxiliary picture can display effective pictures as much as possible, which improves the efficiency of the auxiliary picture in transmitting information beneficial to user operations, and may better ensure that the user can observe the effective picture content behind the vehicle while observing the picture in front of the virtual vehicle normally, thereby improving the interaction efficiency during control of the virtual vehicles by the user, and improving the efficiency of human-computer interaction.

Figure 13:
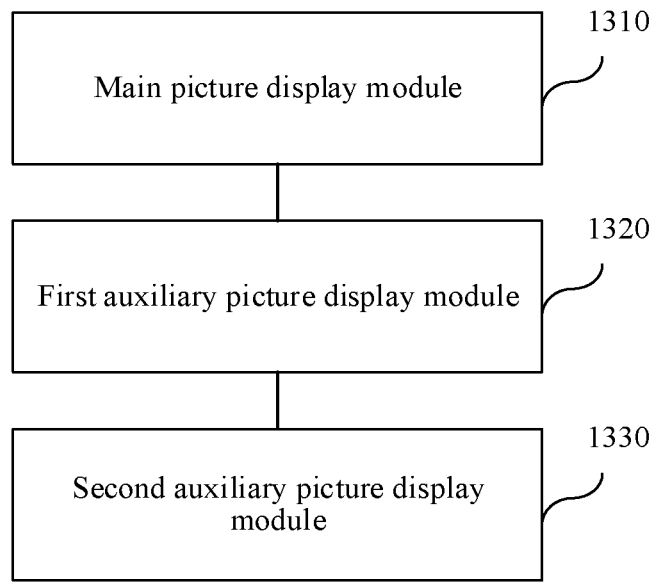
FIG. 13 is a structural block diagram of an apparatus for displaying a picture in a virtual scene according to an embodiment of this disclosure.

FIG. 13 is a structural block diagram of an apparatus for displaying a picture in a virtual scene according to an embodiment of this disclosure. The apparatus for displaying a picture in a virtual scene is applicable to a terminal, to perform all or some steps performed by the terminal in the method shown in the embodiment corresponding to FIG. 4 or FIG. 5. The apparatus for displaying a picture in a virtual scene may include a main picture display module 1310, a first auxiliary picture display module 1320, and a second auxiliary picture display module 1330.

The main picture display module 1310 is configured to display a virtual scene picture, the virtual scene picture including a first virtual vehicle. The first auxiliary picture display module 1320 is configured to display a first auxiliary picture in the virtual scene picture, the first auxiliary picture being a picture with a first target virtual vehicle as a focus and captured by a virtual camera arranged corresponding to the first virtual vehicle; and the first target virtual vehicle being a virtual vehicle with a smallest relative distance from the first virtual vehicle and the relative distance being less than or equal to a first distance. The second auxiliary picture display module 1330 is configured to display a second auxiliary picture in the virtual scene picture in response to the virtual vehicle with the smallest relative distance from the first virtual vehicle and the relative distance being less than or equal to the first distance being switched to a second target virtual vehicle, the second auxiliary picture being a picture with the second target virtual vehicle as a focus and captured by the virtual camera arranged corresponding to the first virtual vehicle.

According to the embodiments of this disclosure, the relative distance between the first virtual vehicle and the second virtual vehicle is detected in real time, the target virtual vehicle is determined, the virtual scene is captured by the virtual camera with the target virtual vehicle as the focus, and the captured auxiliary picture is displayed. Since the relative distance between the second virtual vehicle and the first virtual vehicle may change frequently, the target virtual vehicle corresponding to each moment can be flexibly determined through the foregoing solution, and the auxiliary picture with the target virtual vehicle as the focus is displayed. Therefore, the auxiliary picture can display effective pictures as much as possible, which improves the efficiency of the auxiliary picture in transmitting information beneficial to user operations, and may better ensure that the user can observe the effective picture content behind the vehicle while observing the picture in front of the virtual vehicle normally, thereby improving the interaction efficiency during control of the virtual vehicles by the user, and improving the efficiency of human-computer interaction.

Figure 14:
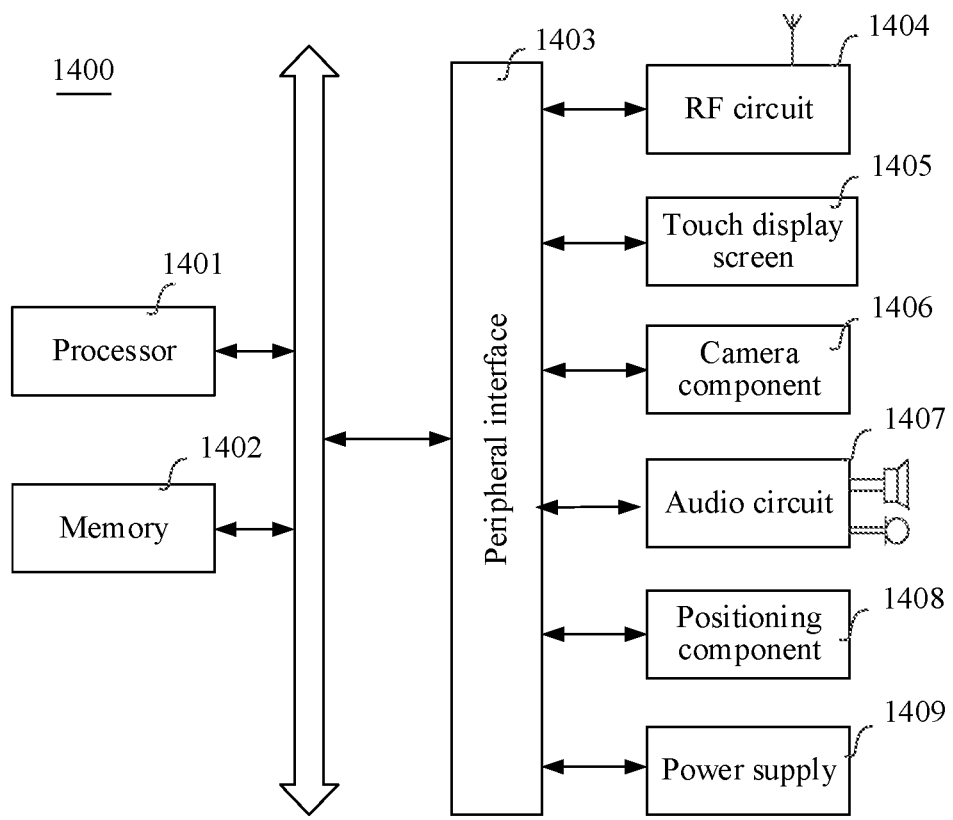
FIG. 14 is a structural block diagram of a computer device according to an embodiment of this disclosure.

FIG. 14 is a structural block diagram of a computer device 1400 according to an embodiment of this disclosure. The computer device 1400 may be a user terminal, such as a smartphone, a tablet computer, a Moving Picture Experts Group Audio Layer III (MP3) player, an MP4 player, a notebook computer, or a desktop computer. The computer device 1400 may be further referred to as another name such as user equipment, a portable terminal, a laptop terminal, or a desktop terminal.

Generally, the computer device 1400 includes processing circuitry, such as a processor 1401, and a memory 1402.

Processing circuitry, such as the processor 1401, may include one or more processing cores, for example, a 4-core processor or an 8-core processor. The processor 1401 may be implemented by using at least one hardware form of a digital signal processor (DSP), a field-programmable gate array (FPGA), and a programmable logic array (PLA). The processor 1401 may alternatively include a main processor and a coprocessor. The main processor is configured to process data in an awake state, also referred to as a central processing unit (CPU). The coprocessor is a low-power processor configured to process data in a standby state. In some embodiments, the processor 1401 may be integrated with a graphics processing unit (GPU). The GPU is configured to render and draw content that needs to be displayed on a display screen. In some embodiments, the processor 1401 may further include an artificial intelligence (AI) processor. The AI processor is configured to process computing operations related to machine learning.

The memory 1402 may include one or more computer-readable storage media that may be non-transitory. The memory 1402 may further include a high-speed random access memory and a non-volatile memory, for example, one or more disk storage devices or flash storage devices. In some embodiments, a non-transitory computer-readable storage medium in the memory 1402 is configured to store at least one instruction, the at least one instruction being configured to be executed by the processor 1401 to implement all or some steps performed in the method provided in the embodiments of this disclosure.

In some embodiments, the computer device 1400 further includes a peripheral device interface 1403 and at least one peripheral device. The processor 1401, the memory 1402, and the peripheral device interface 1403 may be connected by using a bus or a signal cable. Each peripheral device may be connected to the peripheral device interface 1403 by using a bus, a signal cable, or a circuit board. Specifically, the peripheral includes: at least one of a radio frequency circuit 1404, a display screen 1405, a camera component 1406, an audio circuit 1407, a positioning component 1408, and a power supply 1409.

A person skilled in the art may understand that the structure shown in FIG. 14 is merely exemplary and does not constitute any limitation on the computer device 1400, and the computer device may include more components or fewer components than those shown in the figure, or some components may be combined, or a different component configuration may be used.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

In an exemplary embodiment, a non-temporary computer-readable storage medium including an instruction is further provided. For example, the non-temporary computer-readable storage medium includes at least one instruction, at least one program, a code set, or an instruction set. The at least one instruction, the at least one program, the code set, or the instruction set may be executed by a processor to implement all or some steps of the method shown in the embodiments corresponding to FIG. 3, FIG. 4, or FIG. 5. For example, the non-transitory computer-readable storage medium may be a read-only memory (ROM), a random access memory (RAM), a compact disc read-only memory (CD-ROM), a tape, a floppy disk, an optical data storage device, or the like.

An embodiment of this disclosure provides a computer program product or a computer program. The computer program product or the computer program includes computer instructions, and the computer instructions are stored in a computer-readable storage medium. A processor of a terminal reads the computer instructions from the computer-readable storage medium, and executes the computer instructions, to cause the terminal to perform the method for displaying a picture in a virtual scene in various implementations of the foregoing aspect.

Other implementation solutions of this disclosure should become apparent after considering the specification and practicing the embodiments disclosed herein. This disclosure is intended to cover any variations, uses or adaptive changes of this disclosure. Such variations, uses or adaptive changes follow the general principles of this disclosure. The specification and the embodiments are considered as merely exemplary.

It should be understood that this disclosure is not limited to the precise structures described above and shown in the accompanying drawings, and various modifications and changes can be made without departing from the scope of this disclosure.

What is claimed is:

1. A method for displaying a picture in a virtual scene, the method comprising:
   displaying the virtual scene of a virtual environment, the virtual scene including a first virtual vehicle;
   obtaining, by processing circuitry, a distance between the first virtual vehicle and each of at least one second virtual vehicle;
   determining a target virtual vehicle of the at least one second virtual vehicle based on the distance obtained by the processing circuitry between the first virtual vehicle and each of the at least one second virtual vehicle, each of the at least one second virtual vehicle being located behind the first virtual vehicle in the virtual environment; and
   displaying an auxiliary picture in the virtual scene, the auxiliary picture being of the target virtual vehicle from a point of view associated with the first virtual vehicle.

2. The method according to claim 1, wherein
   the at least one second virtual vehicle includes a plurality of second virtual vehicles, the distances between the first virtual vehicle and the plurality of second virtual vehicles are less than or equal to a first distance; and
   determining the target virtual vehicle from the plurality of second virtual vehicles.

3. The method according to claim 2, wherein the determining the target virtual vehicle from the plurality of second virtual vehicles comprises:
   determining the second virtual vehicle with a smallest distance from the first virtual vehicle as the target virtual vehicle.

4. The method according to claim 1, wherein the determining the target virtual vehicle comprises:
   obtaining the second virtual vehicle of the at least one second virtual vehicle with a smallest distance from the first virtual vehicle; and determining the second virtual vehicle as the target virtual vehicle based on the distance between the second virtual vehicle and the first virtual vehicle being less than or equal to a first distance.

5. The method according to claim 1, wherein the obtaining the distance between the first virtual vehicle and each of the at least one second virtual vehicle comprises:
   determining a length of a line connecting a point of the first virtual vehicle and a point of each of the at least one second virtual vehicle as the distance of the respective second virtual vehicle.

6. The method according to claim 1, further comprising:
   starting a picture display timer based on the auxiliary picture being displayed in the virtual scene, the picture display timer being configured to time a duration of continuous display of the auxiliary picture in the virtual scene; and
   ending the display of the auxiliary picture in response to the timed duration reaching a first duration.

7. The method according to claim 6, wherein before the ending the display of the auxiliary picture, the method further comprises:
   resetting the picture display timer based on the target virtual vehicle being switched from a first target virtual vehicle of the at least one second virtual vehicle to a second target virtual vehicle of the at least one second virtual vehicle during the display of the auxiliary picture.

8. The method according to claim 1, wherein a reference point of the point of view is located obliquely above the first virtual vehicle, and the reference point is fixed relative to the first virtual vehicle; and
   before the displaying the auxiliary picture in the virtual scene, the method further comprises:
   obtaining a first obtuse angle between a direction of the point of view and a rear reference line, the direction of the point of view being from the reference point to a point of the target virtual vehicle, the rear reference line being parallel to a rear of the first virtual vehicle; and
   determining the point of view based on a position of the target virtual vehicle based on the first obtuse angle being less than or equal to a first angle.

9. The method according to claim 8, further comprising:
   determining the point of view that corresponds to a second obtuse angle based on the first obtuse angle being greater than the first angle, the second obtuse angle between the direction of the point of view and the rear reference line being less than or equal to the first angle.

10. The method according to claim 9, further comprising:
    ending the display of the auxiliary picture based on a duration for which the first obtuse angle is greater than the first angle reaching a second duration.

11. The method according to claim 1, wherein the displaying the auxiliary picture comprises:
    maintaining the point of view of the target virtual vehicle based on the distance between the target virtual vehicle and the first virtual vehicle being less than or equal to a second distance; and
    displaying, in the virtual scene, the auxiliary picture in the point of view captured by a virtual camera.

12. The method according to claim 1, wherein the displaying the auxiliary picture comprises:
    displaying the auxiliary picture in the virtual scene based on a display time of the virtual scene being greater than a display duration.

13. The method according to claim 1, wherein
    the displaying the auxiliary picture includes displaying a first auxiliary picture in the virtual scene, the first auxiliary picture being of a first target virtual vehicle and captured by a virtual camera arranged relative to the first virtual vehicle; and the first target virtual vehicle being a virtual vehicle with a smallest distance from the first virtual vehicle and the distance being less than or equal to a first distance; and
    the method further includes:
    displaying a second auxiliary picture in the virtual scene based on the virtual vehicle with the smallest relative distance from the first virtual vehicle and the relative distance being less than or equal to the first distance being switched to a second target virtual vehicle, the second auxiliary picture being of the second target virtual vehicle and captured by the virtual camera arranged relative to the first virtual vehicle.

14. The method according to claim 1, wherein the displaying the auxiliary picture in the virtual scene comprises:
    displaying the auxiliary picture at a subregion of the virtual scene.

15. An apparatus for displaying a picture in a virtual scene, comprising:
    processing circuitry configured to:
    display the virtual scene of a virtual environment, the virtual scene including a first virtual vehicle;
    obtain a distance between the first virtual vehicle and each of at least one second virtual vehicle;
    determining a target virtual vehicle of the at least one second virtual vehicle based on the obtained distance between the first virtual vehicle and each of the at least one second virtual vehicle, each of the at least one second virtual vehicle being located behind the first virtual vehicle in the virtual environment; and
    display an auxiliary picture in the virtual scene, the auxiliary picture being of the target virtual vehicle from a point of view associated with the first virtual vehicle.

16. The apparatus according to claim 15, wherein
    the at least one second virtual vehicle includes a plurality of second virtual vehicles, the distances between the first virtual vehicle and the plurality of second virtual vehicles are less than or equal to a first distance; and
    the processing circuitry is configured to determine the target virtual vehicle from the plurality of second virtual vehicles.

17. The apparatus according to claim 16, wherein the processing circuitry is configured to:
    determine the second virtual vehicle with a smallest distance from the first virtual vehicle as the target virtual vehicle.

18. The apparatus according to claim 15, wherein the processing circuitry is configured to:
    obtain the second virtual vehicle of the at least one second virtual vehicle with a smallest distance from the first virtual vehicle; and
    determine the second virtual vehicle as the target virtual vehicle based on the distance between the second virtual vehicle and the first virtual vehicle being less than or equal to a first distance.

19. A non-transitory computer-readable storage medium, storing instructions which when executed by a processor cause the processor to perform:
    displaying a virtual scene of a virtual environment, the virtual scene including a first virtual vehicle;

obtaining a distance between the first virtual vehicle and each of at least one second virtual vehicle;

determining a target virtual vehicle of the at least one second virtual vehicle based on the obtained distance between the first virtual vehicle and each of the at least one second virtual vehicle, each of the at least one second virtual vehicle being located behind the first virtual vehicle in the virtual environment; and displaying an auxiliary picture in the virtual scene, the auxiliary picture being of the target virtual vehicle from a point of view associated with the first virtual vehicle.

* * * * *